United States Patent
Akai et al.

(10) Patent No.: US 12,179,537 B2
(45) Date of Patent: Dec. 31, 2024

(54) INFORMATION PROCESSING DEVICE, VEHICLE CONTROL METHOD, AND INFORMATION PROCESSING SYSTEM

(71) Applicant: Hitachi Automotive Systems, Ltd., Hitachinaka (JP)

(72) Inventors: Akihito Akai, Tokyo (JP); Nobuyuki Ichimaru, Hitachinaka (JP); Ryusuke Hirao, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 693 days.

(21) Appl. No.: 17/267,391

(22) PCT Filed: Jul. 18, 2019

(86) PCT No.: PCT/JP2019/028314
§ 371 (c)(1),
(2) Date: Feb. 9, 2021

(87) PCT Pub. No.: WO2020/031652
PCT Pub. Date: Feb. 13, 2020

(65) Prior Publication Data
US 2021/0291607 A1    Sep. 23, 2021

(30) Foreign Application Priority Data
Aug. 10, 2018   (JP) ................................ 2018-151282

(51) Int. Cl.
*B60G 17/016* (2006.01)
*G01C 21/00* (2006.01)
*G07C 5/04* (2006.01)

(52) U.S. Cl.
CPC ........ *B60G 17/016* (2013.01); *G01C 21/3811* (2020.08); *G01C 21/3815* (2020.08);
(Continued)

(58) Field of Classification Search
CPC .............. B60G 17/016; B60G 2300/00; G01C 21/3811; G01C 21/3815; G07C 5/04
(Continued)

(56) References Cited

U.S. PATENT DOCUMENTS 9,390,062 B1 * 7/2016 Ashton ................... B60L 50/10
10,445,950 B1 * 10/2019 De ....................... G07C 5/0825
(Continued)

FOREIGN PATENT DOCUMENTS

DE  10 2009 054 460 A1   6/2011
DE  10 2013 210 553 A1  12/2014
(Continued)

OTHER PUBLICATIONS

Japanese-language Office Action issues in Japanese Application No. 2018-151282 dated Nov. 2, 2021 with English translation (nine (9) pages).
(Continued)

*Primary Examiner* — Krishnan Ramesh
(74) *Attorney, Agent, or Firm* — Crowell & Moring LLP

(57) ABSTRACT provided is an information processing device comprising: a map database in which a control parameter for controlling the behavior of the vehicle is recorded for each vehicle type at each point on a road; a data reading unit that acquires vehicle information including at least vehicle type information and positional information of the vehicle and reads the control parameter corresponding to the travel point of the vehicle from the map database based on the vehicle information; a parameter setting unit that sets an application control parameter to be applied to control of the vehicle based on the control parameter read by the data reading unit; and a data update unit that acquires an observation value related to the behavior of the vehicle controlled based on the
(Continued)

application control parameter from the vehicle and updates the map database based on the observation value.

17 Claims, 12 Drawing Sheets

(52) U.S. Cl.
CPC .......... *G07C 5/04* (2013.01); *B60G 2300/00* (2013.01); *B60G 2400/0521* (2013.01); *B60G 2400/0522* (2013.01); *B60G 2400/0523* (2013.01); *B60G 2400/102* (2013.01); *B60G 2400/104* (2013.01); *B60G 2400/106* (2013.01); *B60G 2400/204* (2013.01); *B60G 2400/34* (2013.01); *B60G 2400/39* (2013.01); *B60G 2400/41* (2013.01); *B60G 2400/82* (2013.01); *B60G 2400/84* (2013.01); *B60G 2400/96* (2013.01); *B60G 2500/10* (2013.01)

(58) Field of Classification Search
USPC .......................................................... 701/37
See application file for complete search history.

(56) References Cited

U.S. PATENT DOCUMENTS

| | | | |
|---|---|---|---|
| 10,486,485 B1* | 11/2019 | Levinson | B60G 17/0162 |
| 2009/0005929 A1 | 1/2009 | Nakao et al. | |
| 2009/0018717 A1* | 1/2009 | Reed | G05D 1/0278 701/25 |
| 2015/0112512 A1* | 4/2015 | Fan | B60G 17/02 701/1 |
| 2016/0244065 A1 | 8/2016 | Wagner | |
| 2016/0280224 A1* | 9/2016 | Tatourian | B60W 30/143 |
| 2017/0305437 A1* | 10/2017 | Onorato | B60W 50/0098 |
| 2018/0079271 A1 | 3/2018 | Zwanzger et al. | |
| 2018/0348775 A1* | 12/2018 | Yu | B60W 30/1882 |
| 2019/0016188 A1 | 1/2019 | Hachisuka et al. | |
| 2019/0126711 A1* | 5/2019 | Giovanardi | B60G 17/0161 |
| 2020/0050209 A1* | 2/2020 | Bai | G01C 21/3492 |

FOREIGN PATENT DOCUMENTS

| | | |
|---|---|---|
| DE | 10 2015 203 062 A1 | 8/2016 |
| DE | 10 2015 205 210 A1 | 9/2016 |
| JP | 9-198108 A | 7/1997 |
| JP | 10-181482 A | 7/1998 |
| JP | 2003-49702 A | 2/2003 |
| JP | 2004-161259 A | 6/2004 |
| JP | 2006-218950 A | 8/2006 |
| JP | 2006-240401 A | 9/2006 |
| JP | 2007-8421 A | 1/2007 |
| JP | 2007-62445 A | 3/2007 |
| JP | 2007-196776 A | 8/2007 |
| JP | 2009-6946 A | 1/2009 |
| JP | 2010-55303 A | 3/2010 |
| JP | 2013-173490 A | 9/2013 |
| JP | 2013-205351 A | 10/2013 |
| WO | WO 2017/061260 A1 | 4/2017 |
| WO | WO 2017/169203 A1 | 10/2017 |

OTHER PUBLICATIONS

German-language Office Action issued in German Application No. 11 2019 003 525.8 dated Feb. 8, 2022 with English translation (10 pages).
International Search Report (PCT/ISA/210) issued in PCT Application No. PCT/JP2019/028314 dated Oct. 1, 2019 with English translation (six (6) pages).
Japanese-language Written Opinion (PCT/ISA/237) issued in PCT Application No. PCT/JP2019/028314 dated Oct. 1, 2019 (six (6) pages).

* cited by examiner

FIG. 3

| ROAD POINT | LATITUDE | LONGITUDE | ELEVATION m | NUMBER OF LANES | CONNECTION DESTINATION 1 | CONNECTION DESTINATION 2 | ... | SPEED LIMIT | TRAFFIC SIGN 1 | TRAFFIC SIGN 2 |
|---|---|---|---|---|---|---|---|---|---|---|
| A | 35.704 | 139.486 | 90.0 | 2 | B | | | 40 | | |
| B | 35.705 | 139.485 | 89.9 | 2 | C | | | 40 | | |
| C | 35.705 | 139.484 | 89.8 | 2 | D | | | 40 | | |
| D | 35.706 | 139.483 | 89.7 | 2 | E | | | 40 | | |
| E | 35.706 | 139.482 | 89.6 | 2 | F | | | 40 | | |
| F | 35.707 | 139.481 | 89.5 | 2 | G | | | 40 | | |
| .. | .. | .. | .. | .. | .. | .. | .. | .. | .. | .. |
| a | 35.706 | 139.477 | 89.6 | 1 | b | | | 30 | | |
| b | 35.707 | 139.478 | 89.6 | 1 | c | | | 30 | TEMPORARY STOP | |
| c | 35.708 | 139.478 | 89.6 | 1 | E | | | 30 | | |
| .. | .. | .. | .. | .. | .. | .. | .. | .. | .. | .. |

| | 401 DATA MANAGEMENT TABLE FOR VEHICLE TYPE a/ROAD POINT A | | | | 402 FOR VEHICLE TYPE b/ ROAD POINT A | 403 FOR VEHICLE TYPE c/ ROAD POINT A | | | |
|---|---|---|---|---|---|---|---|---|---|
| CON-DITION No. | VEHICLE INFORMATION | | | | CONTROL PARAMETER | OBSERVATION VALUE | | | DETERMI-NATION |
| | VEHICLE SPEED Km/h | ACCEL-ERATION m/s$_2$ | CARRYING CAPACITY kg | .. | | ROLL RATE deg/s | PITCH RATE deg/s | YAW RATE deg/s | |
| 1 | 40 | −0.04 | 100 | .. | 0x06 | 0.295 | −0.149 | 0.015 | 0 |
| 2 | 40 | −0.02 | 100 | .. | 0x04 | 0.304 | −0.06 | 0.019 | 1 |
| 3 | 40 | 0.00 | 100 | .. | 0x03 | 0.318 | 0.026 | 0.024 | 1 |
| 4 | 40 | +0.02 | 100 | .. | 0x02 | 0.334 | 0.111 | 0.028 | 1 |
| 5 | 40 | +0.04 | 100 | .. | 0x00 | 0.353 | 0.192 | 0.032 | 0 |
| 6 | 50 | −0.04 | 100 | .. | 0x07 | 0.375 | 0.269 | 0.036 | 0 |
| 7 | 50 | −0.02 | 100 | .. | 0x05 | 0.398 | 0.342 | 0.040 | 1 |
| 8 | 50 | 0.00 | 100 | .. | 0x04 | 0.423 | 0.410 | 0.044 | 1 |
| 9 | 50 | +0.02 | 100 | .. | 0x03 | 0.449 | 0.473 | 0.047 | 1 |
| 10 | 50 | +0.04 | 100 | .. | 0x01 | 0.499 | 0.531 | 0.051 | 0 |
| : | : | : | : | | : | : | : | : | : |
| m−1 | 60 | −0.04 | 300 | .. | 0x11 | 0.615 | 0.773 | 0.074 | 0 |
| m | 60 | −0.02 | 300 | .. | 0x0F | 0.618 | 0.777 | 0.076 | 1 |
| m+1 | 40 | 0.00 | 300 | .. | 0x0E | 0.603 | 0.760 | 0.078 | 1 |
| m+2 | 60 | +0.02 | 300 | .. | 0x0D | 0.617 | 0.776 | 0.077 | 1 |
| : | : | : | : | | : | : | : | : | |
| n−1 | 100 | −0.04 | 200 | .. | 0x11 | 0.491 | −0.234 | 0.001 | 0 |
| n | 100 | −0.02 | 200 | .. | 0x0F | 0.511 | −0.224 | 0.004 | 0 |
| n+1 | 100 | 0.00 | 200 | .. | 0x0E | 0.409 | −0.180 | 0.016 | 1 |
| n+2 | 100 | +0.02 | 200 | .. | 0x0D | 0.503 | −0.162 | 0.019 | 0 |
| : | : | : | : | | : | : | : | : | |

| AUTOMOBILE MANUFACTURER | VEHICLE TYPE | REFERENCE VALUE |
|---|---|---|
| MANUFACTURER i | VEHICLE TYPE 1 | 0.1 |
| | VEHICLE TYPE 2 | 0.2 |
| ⋮ | ⋮ | ⋮ |
| MANUFACTURER ii | VEHICLE TYPE n | 0.1 |
| | VEHICLE TYPE n+1 | 0.3 |
| ⋮ | ⋮ | ⋮ |
| COMMON | COMMON | 0 |

| DIFFERENCE VALUE | SEARCH MAXIMUM VALUE |
|---|---|
| 0.01 | 0x01 |
| 0.05 | 0x02 |
| 0.10 | 0x05 |
| 0.20 | 0x0A |
| 0.50 | 0x14 |
| 1.00 | 0x32 |

| | 401 | 402 | 403 |
|---|---|---|---|
| | DATA MANAGEMENT TABLE FOR VEHICLE TYPE a/ROAD POINT A | FOR VEHICLE TYPE b/ ROAD POINT A | FOR VEHICLE TYPE c/ ROAD POINT A |

| CON-DITION No. | VEHICLE INFORMATION ||| CONTROL PARAMETER | OBSERVATION VALUE ||| PASS/FAIL DETERMI-NATION VALUE | DETERMI-NATION |
|---|---|---|---|---|---|---|---|---|---|
| | VEHICLE SPEED Km/h | ACCEL-ERATION m/s₂ | CARRYING CAPACITY kg | | ROLL RATE deg/s | PITCH RATE deg/s | YAW RATE deg/s | | |
| 1 | 40 | -0.04 | 100 | 0x06 | 0.295 | -0.149 | 0.015 | 75 | 0 |
| 2 | 40 | -0.02 | 100 | 0x04 | 0.304 | -0.06 | 0.019 | 105 | 1 |
| 3 | 40 | 0.00 | 100 | 0x03 | 0.318 | 0.026 | 0.024 | 106 | 1 |
| 4 | 40 | +0.02 | 100 | 0x02 | 0.334 | 0.111 | 0.028 | 104 | 1 |
| 5 | 40 | +0.04 | 100 | 0x00 | 0.353 | 0.192 | 0.032 | 95 | 0 |
| 6 | 50 | -0.04 | 100 | 0x07 | 0.375 | 0.269 | 0.036 | 81 | 0 |
| 7 | 50 | -0.02 | 100 | 0x05 | 0.398 | 0.342 | 0.040 | 101 | 1 |
| 8 | 50 | 0.00 | 100 | 0x04 | 0.423 | 0.410 | 0.044 | 107 | 1 |
| 9 | 50 | +0.02 | 100 | 0x03 | 0.449 | 0.473 | 0.047 | 100 | 1 |
| 10 | 50 | +0.04 | 100 | 0x01 | 0.499 | 0.531 | 0.051 | 98 | 0 |
| ⋮ | ⋮ | ⋮ | ⋮ | ⋮ | ⋮ | ⋮ | ⋮ | ⋮ | ⋮ |
| m-1 | 60 | -0.04 | 300 | 0x11 | 0.615 | 0.773 | 0.074 | 85 | 0 |
| m | 60 | -0.02 | 300 | 0x0F | 0.618 | 0.777 | 0.076 | 100 | 1 |
| m+1 | 40 | 0.00 | 300 | 0x0E | 0.603 | 0.760 | 0.078 | 104 | 1 |
| m+2 | 60 | +0.02 | 300 | 0x0D | 0.617 | 0.776 | 0.077 | 103 | 1 |
| ⋮ | ⋮ | ⋮ | ⋮ | ⋮ | ⋮ | ⋮ | ⋮ | ⋮ | ⋮ |
| n-1 | 100 | -0.04 | 200 | 0x11 | 0.491 | -0.234 | 0.001 | 71 | 0 |
| n | 100 | -0.02 | 200 | 0x0F | 0.511 | -0.224 | 0.004 | 84 | 0 |
| n+1 | 100 | 0.00 | 200 | 0x0E | 0.409 | -0.180 | 0.016 | 100 | 1 |
| n+2 | 100 | +0.02 | 200 | 0x0D | 0.503 | -0.162 | 0.019 | 81 | 0 |
| ⋮ | ⋮ | ⋮ | ⋮ | ⋮ | ⋮ | ⋮ | ⋮ | ⋮ | ⋮ |

INFORMATION PROCESSING DEVICE, VEHICLE CONTROL METHOD, AND INFORMATION PROCESSING SYSTEM

TECHNICAL FIELD

The present invention relates to an information processing device, and a vehicle control method and an information processing system using the same.

BACKGROUND ART

The vibration stimulus generated when tires of a travelling vehicle pass through an uneven surface is attenuated by the suspension of the vehicle, and is transmitted to occupants via a chassis and a seat. Therefore, the damping characteristics of the suspension largely affect the riding comfort felt by the occupants.

It has been well known from the past to improve the riding comfort of occupants by mounting a suspension capable of adjusting damping force on a vehicle such as an automobile and by appropriately controlling the damping force. Patent Literature 1 discloses a suspension control system including: a storage unit 40 that stores a detection value of the operation amount of a suspension as tuning data in association with map information of a navigation system 319; a communication unit 50 that transmits the tuning data to an external server 3; an operation unit 70 that determines a setting value of the suspension based on the transmitted tuning data in the external server 3; and a driving unit 11 that receives the determined setting value and drives an actuator 20 based on the received setting value to adjust damping force of the suspension.

CITATION LIST

Patent Literature

[Patent Literature 1] Japanese Unexamined Patent Application Publication No. 2013-173490

SUMMARY OF INVENTION

Technical Problem

According to the prior art described in Patent Literature 1, when the setting value of the suspension is determined based on the tuning data transmitted from the vehicle to the external server, it is not always possible to determine the optimum setting value. Therefore, there is room for further improvement in the riding comfort of occupants on the vehicle.

Solution to Problem

According to the present invention, provided is an information processing device that is connected to a vehicle via a network, comprising: a map database in which a control parameter for controlling the behavior of the vehicle is recorded for each vehicle type at each point on a road; a data reading unit that acquires vehicle information including at least vehicle type information and positional information of the vehicle and reads the control parameter corresponding to the travel point of the vehicle from the map database based on the vehicle information; a parameter setting unit that sets an application control parameter to be applied to control of the vehicle based on the control parameter read by the data reading unit; and a data update unit that acquires an observation value related to the behavior of the vehicle controlled based on the application control parameter from the vehicle and updates the map database based on the observation value.

According to the present invention, provided is a vehicle control method for controlling the behavior of a vehicle using an information processing device connected to the vehicle via a network, in which a control parameter for controlling the behavior of the vehicle is preliminarily recorded in a map database included in the information processing device for each vehicle type at each point on a road, vehicle information including at least vehicle type information and positional information of the vehicle is transmitted from the vehicle to the information processing device, the control parameter corresponding to the travel point of the vehicle is read from the map database based on the vehicle information received by the information processing device, the application control parameter to be applied to control of the vehicle is set based on the control parameter read from the map database, the set application control parameter is transmitted from the information processing device to the vehicle, control based on the application control parameter is performed for the vehicle, an observation value related to the behavior of the vehicle controlled based on the application control parameter is transmitted from the vehicle to the information processing device, and the map database is updated based on the observation value received by the information processing device.

According to the present invention, provided is an information processing system comprising: an edge-side information processing device mounted on a vehicle, and a center-side information processing device connected to the edge-side information processing device via a network, in which the center-side information processing device includes: a map database in which a control parameter for controlling the behavior of the vehicle is recorded for each vehicle type at each point on a road; a data reading unit that acquires vehicle information including at least vehicle type information and positional information of the vehicle and reads the control parameter corresponding to the travel point of the vehicle from the map database based on the vehicle information; a parameter setting unit that sets an application control parameter to be applied to control of the vehicle based on the control parameter read by the data reading unit; and a data update unit that acquires an observation value related to the behavior of the vehicle controlled based on the application control parameter from the vehicle and updates the map database based on the observation value, the edge-side information processing device includes: a vehicle information management unit that manages the vehicle information; an observation unit that acquires the observation value from the vehicle; and a transmission/reception unit that transmits the vehicle information and the observation value to the center-side information processing device and receives the application control parameter from the center-side information processing device.

Advantageous Effects of Invention

According to the present invention, it is possible to improve the riding comfort of occupants on a vehicle.

BRIEF DESCRIPTION OF DRAWINGS

FIG. 3 is a diagram for showing an example of the road information.

FIG. 4 is a diagram for showing an example of the parameter management information according to the first embodiment.

FIG. 5 is a diagram for showing an example of a reference value table by vehicle type.

FIG. 6 is a diagram for showing an example of a search value table.

FIG. 9 is a diagram for showing an example of parameter management information according to the second embodiment.

DESCRIPTION OF EMBODIMENTS

First Embodiment

A first embodiment of the present invention will be described below using FIG. 1 to FIG. 7.

Figure 1:
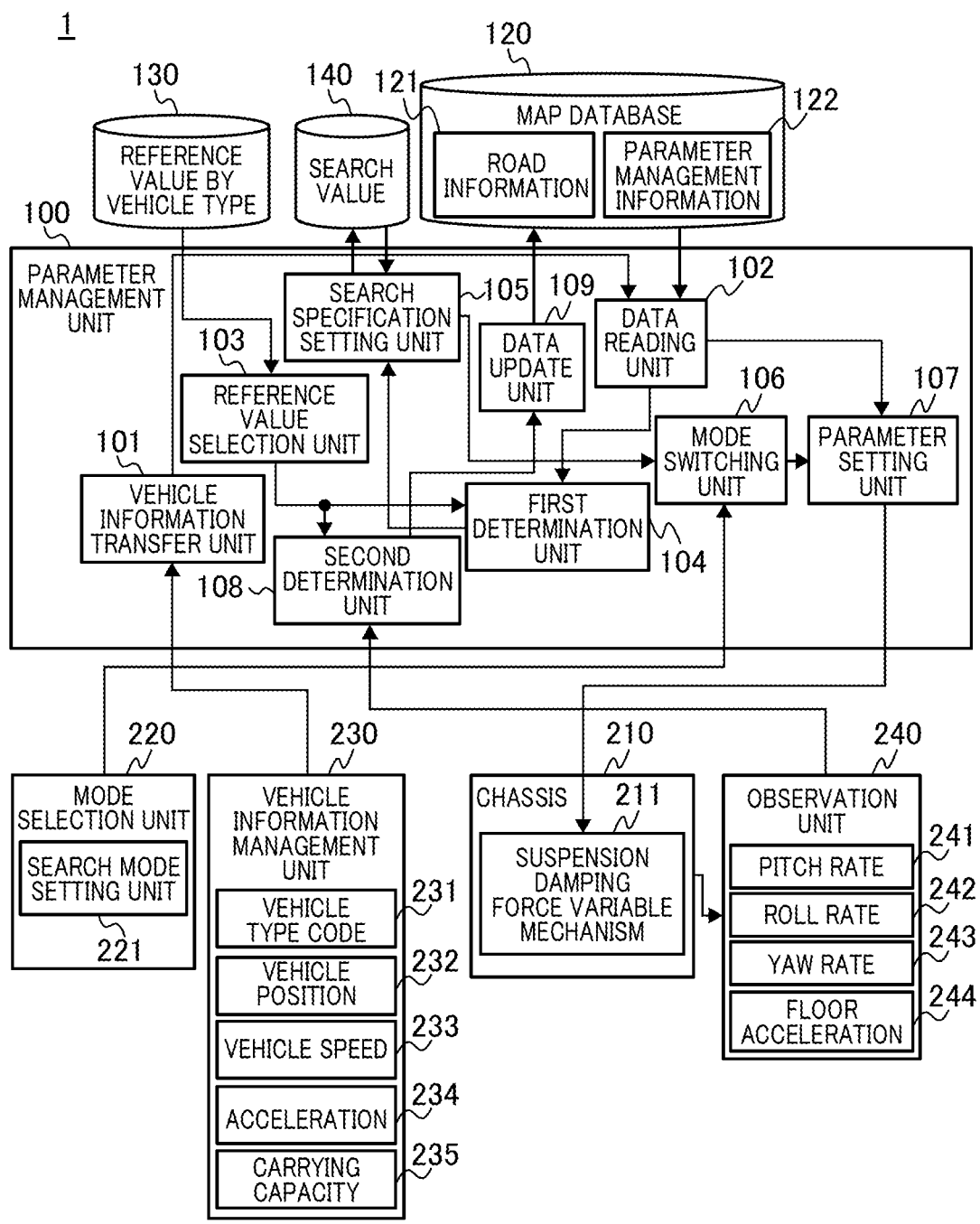
FIG. 1 is a block diagram for showing a functional configuration of an information processing system according to a first embodiment.

FIG. 1 is a block diagram for showing a functional configuration of an information processing system according to the first embodiment. The information processing system 1 shown in FIG. 1 is a system used to improve the riding comfort felt by occupants of a vehicle by adjusting the damping force of a suspension mounted on the vehicle such as an automobile. The information processing system 1 has each functional block of a parameter management unit 100, a map database 120, a reference value table by vehicle type 130, a search value table 140, a chassis 210, a mode selection unit 220, a vehicle information management unit 230, and an observation unit 240.

The parameter management unit 100 includes a vehicle information transfer unit 101, a data reading unit 102, a reference value selection unit 103, a first determination unit 104, a search specification setting unit 105, a mode switching unit 106, a parameter setting unit 107, a second determination unit 108, and a data update unit 109. It should be noted that details of these functional blocks will be described later.

The chassis 210 is a constitutional element of a vehicle (hereinafter, referred to as "own vehicle") to which the information processing system 1 adjusts the damping force of the suspension. The chassis 210 corresponds to an underbody part of the own vehicle, and is configured to include, for example, a body frame, an engine, a transmission, a drive shaft, a steering gear, a suspension, and the like. The chassis 210 has a suspension damping force variable mechanism 211 to control the damping force of the suspension of the own vehicle. The suspension damping force variable mechanism 211 is configured using, for example, a hydraulic variable damping damper capable of mechanically changing the flow path shape of a hydraulic oil, and electro rheological fluid (ERF) whose viscosity changes according to electrolysis (voltage) to be applied. However, the suspension damping force variable mechanism 211 is not limited to the above example, and can be arbitrarily formed. It should be noted that the embodiment will be described while specializing the damping force of the suspension of the own vehicle controlled by the information processing system 1. Therefore, only the suspension damping force variable mechanism 211 as a configuration of the chassis 210 is described in FIG. 1.

The mode selection unit 220 performs mode selection to decide the behavior of the own vehicle. The mode selection unit 220 has a search mode setting unit 221 to set a search mode used in the parameter management unit 100 when the information processing system 1 decides an application control parameter to be applied to the own vehicle to control the damping force of the suspension of the own vehicle. The search mode setting unit 221 can set the search mode based on, for example, operation information input by the occupants of the own vehicle through an instrument panel, a car navigation device, a mobile device, and the like. It should be noted that details of a setting method of the search mode by the search mode setting unit 221 and a decision method of the application control parameter according to the search mode by the parameter management unit 100 will be described later.

The vehicle information management unit 230 acquires and manages vehicle information related to the own vehicle. The vehicle information to be managed by the vehicle information management unit 230 includes, for example, a vehicle type code 231 representing vehicle type information of the own vehicle, a vehicle position 232 representing positional information of the own vehicle, a vehicle speed 233 representing the speed of the own vehicle, an acceleration 234 representing the acceleration of the own vehicle, and a carrying capacity 235 representing the total weight of the occupants and loaded cargo of the own vehicle. The vehicle position 232 is detected by, for example, a GPS (Global Positioning System) sensor, and the vehicle speed 233 is acquired by, for example, receiving information from a vehicle speed sensor installed in the own vehicle via CAN (Controller Area Network). In addition, the acceleration 234 and the carrying capacity 235 are detected by an acceleration sensor and a carrying capacity sensor, respectively. It should be noted that the carrying capacity sensor measures the weight of the occupants and loaded cargo in addition to the weight of the own vehicle itself. At this time, if the weight of the own vehicle itself, which is known in advance, is set as an offset amount, only the weight of the occupants and loaded cargo can be measured. However, the configuration of the vehicle information is not limited to the above, but may be any configuration according to control contents performed by the parameter management unit 100. For example, information such as a steering operation, an accelerator operation, and a brake operation performed by the driver of the own vehicle may be included in the vehicle information. Each time the own vehicle runs, the vehicle information management unit 230 transmits these vehicle information to the parameter management unit 100, and inquires about the application control parameter.

The observation unit 240 observes the behavior of the own vehicle, and acquires an observation value according to the observation result from the own vehicle. The observation unit 240 includes a pitch rate sensor 241, a roll rate sensor 242, and a yaw rate sensor 243 that measure, for example, the angular speeds around the rotational axis of the own vehicle set in the lateral, anteroposterior, and vertical directions, respectively, and a floor acceleration sensor 244 that measures the relative acceleration in each of the vertical, anteroposterior, and lateral directions of the floor on which seats for the occupants of the vehicle are installed. It should be noted that the pitch rate sensor 241, the roll rate sensor 242, and the yaw rate sensor 243 are configured using, for example, gyro sensors using crystal or the like as a vibrator, and the floor acceleration sensor 244 is configured using, for example, a strain gauge. Each time the own vehicle runs, the observation unit 240 acquires the observation value measured by each of these sensor, and transmits the same to the parameter management unit 100. It should be noted that the types of sensors configuring the observation unit 240 are not limited to the above sensors. For example, a vehicle height sensor for measuring the height of the own vehicle and an acceleration sensor for measuring acceleration at a place other than the seat installation floor may be included. In addition, as the information of the pitch rate, roll rate, and the like detected by the observation unit 240, not only the information from the dedicated sensors, but also an estimation result based on the wheel speed and the like may be used.

The map database 120 is a database that is configured to include road information 121 and parameter management information 122, and is stored in a storage such as HDD (Hard Disc Drive) and SSD (Solid State Drive). The road information 121 is data representing roads on the map to which information such as the shapes of roads and the number of lanes is added. The parameter management information 122 is data that manages a control parameter for controlling the suspension of the own vehicle. The control parameter at each point on the road represented by the road information 121 is recorded for each vehicle type, and the observation value acquired from the observation unit 240 in the past is recorded while being associated with the control parameter. It should be noted that the control parameter and the observation value recorded in the parameter management information 122 include those set or measured in a vehicle other than the own vehicle. That is, the parameter management information 122 records the control parameter and the observation value for various vehicles, including the own vehicle, at each location by being classified by vehicle type.

Figure 2:
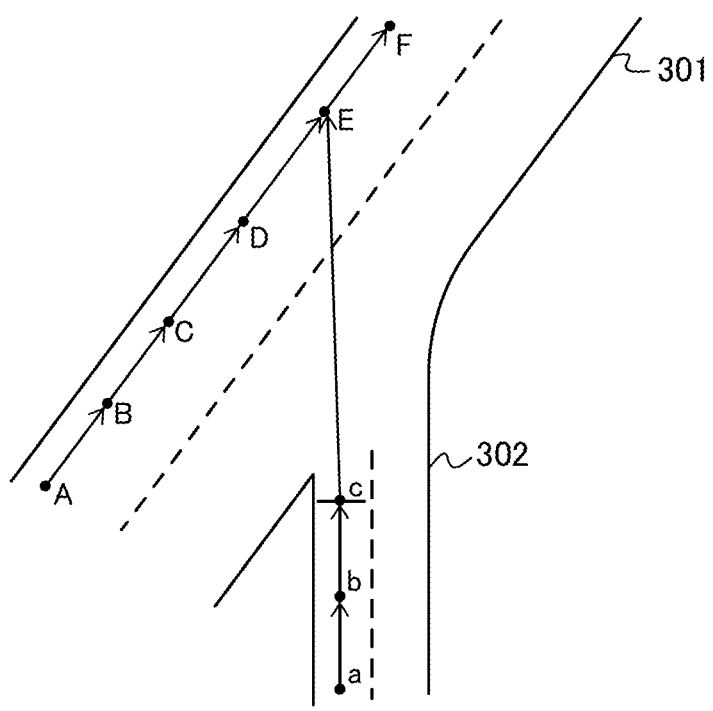
FIG. 2 is a diagram for showing an example of road points used in road information and parameter management information of a map database.

FIG. 2 is a diagram for showing an example of road points used in the road information 121 and the parameter management information 122 of the map database 120. In the example shown in FIG. 2, for a road 301 and a road 302 connected thereto, road points A to F and a to c corresponding to points on the roads are set. In the map database 120, the road information 121 is configured by including the positions and the connection relations of the road points, the number of lanes corresponding to each road point, and other additional information. In the road information 121, it is assumed that the position of each road point is expressed by, for example, latitude, longitude, and the like. In addition, the parameter management information 122 is configured by including the control parameter and the observation value for each road point. Accordingly, the road information 121 and the parameter management information 122 are associated with each other.

FIG. 3 is a diagram for showing an example of the road information 121. In the example shown in FIG. 3, for each of the road points A to F and a to c of FIG. 2, information of an elevation, the number of lanes, a speed limit, and a traffic sign is added, in addition to the positional information expressed by latitude and longitude and a connection destination indicating the connection relation between the road points. Accordingly, various information such as the gradient of the road, a change in the number of lanes, branching/merging at an intersection, a T-junction, and the like, a speed limit, and a traffic instruction at a place where a traffic sign exists is shown for each road point. It should be noted that the road information 121 shown in FIG. 3 is an example, and other data structures may be used.

In the information processing system 1 of the embodiment, for each road point in the road information 121 as shown in FIG. 3, the control parameter used to control the suspension and the observation value acquired in the past for the control parameter are recorded in the map database 120 as the parameter management information 122 for each vehicle type. Further, in response to an inquiry about the application control parameter from the own vehicle, the map database 120 is searched for the road point corresponding to the travel point of the own vehicle, the control parameter and the observation value recorded in the parameter management information 122 for the road point are read from the map database 120, and the application control parameter of the own vehicle is decided. Accordingly, the optimal application control parameter is decided according to the situation of the own vehicle, and is used to control the suspension damping force variable mechanism 211 in the own vehicle.

FIG. 4 is a diagram for showing an example of the parameter management information 122 according to the first embodiment. For example, FIG. 4 shows an example of the parameter management information 122 for the road point A that is one of the road points in the road information 121 of FIG. 3. That is, the parameter management information 122 records the information shown in FIG. 4 for each road point. It should be noted that in the example of FIG. 4, the parameter management information 122 different for each vehicle type can be switched on tabs 401 to 403, and the example of the parameter management information 122 recorded for each vehicle condition is shown for the vehicle type a corresponding to the tab 401.

As shown in FIG. 4, in the parameter management information 122, a unique condition number is given to each vehicle condition defined by a combination of vehicle information such as a vehicle speed, an acceleration, and a carrying capacity, and a combination of the control parameter and the observation value is recorded for each condition number. That is, in the map database 120, the control parameter and the observation value at each point are recorded as the parameter management information 122 for each preset vehicle condition. A determination flag is given to the control parameter to indicate whether or not the control parameter has been obtained as an optimum solution. The observation value includes a roll rate, a pitch rate, and a yaw rate.

The control parameter is information used to control the suspension damping force variable mechanism 211, and corresponds to, for example, an argument of a function in a predetermined control operation and a physical quantity (voltage, current, and the like) for controlling the suspension damping force variable mechanism 211. It should be noted that although the control parameter is expressed by a hexadecimal number using an 8-bit digital value in FIG. 4, the expression format of the control parameter recorded in the parameter management information 122 is not limited to this in the map database 120.

Either "0" or "1" is set to the determination flag. In the case where the control parameter recorded in the parameter management information 122 is obtained as an optimum solution, "1" is set as a determination flag indicating that the optimum value has been derived. On the other hand, in the case where the control parameter recorded in the parameter management information 122 is not obtained as an optimal solution, "0" is set as a determination flag indicating that the optimal value is being searched.

It should be noted that the vehicle conditions are defined by a combination of vehicle information such as a vehicle speed, an acceleration, and a carrying capacity in the example shown in FIG. 4, but the vehicle information that defines the vehicle conditions in the parameter management information 122 is not limited to this. For example, the vehicle conditions may be defined by including a road inclination, weather, temperature, humidity, a road surface condition, and the like at the travel point of the vehicle, or the vehicle conditions may be defined by including vehicle behavior states such as a steering angle, an accelerator operation state, and a brake operation state. In addition, in the example shown in FIG. 4, the vehicle type and the vehicle condition are separately managed, but the vehicle type may be included in the vehicle condition. In addition to the above, arbitrary vehicle information can be used to define the vehicle conditions of the parameter management information 122.

In addition, as the observation values, the roll rate, pitch rate, and yaw rate are used in the example shown in FIG. 4, but the observation values recorded in the parameter management information 122 are not limited to these values. For example, the observation values may be recorded in the parameter management information 122 by including a vertical acceleration, a longitudinal acceleration, and a lateral acceleration of the seat installation floor measured by the floor acceleration sensor 244, and measurement values related to other vehicle behavior such as a vehicle height balance measured by the vehicle height sensor and the slip amount of wheels. Further, the biological information of the occupant of the vehicle, for example, the movement amount of the head position, the movement amount of the center of gravity of the body, the pulse rate, the eye movement, and the like may be measured by the observation unit 240, and the biological information may be recorded in the parameter management information 122 as the observation value. In addition to the above, an arbitrary observation value can be recorded in the parameter management information 122 according to the information that can be measured by the observation unit 240.

It should be noted that there is a possibility that the number of vehicle conditions explosively increase depending on the resolution of data obtained for the vehicle information included in the vehicle conditions in the parameter management information 122. Therefore, in the case where a difference between the values of the vehicle information is small and the values of the control parameters are close to each other, the number of vehicle conditions may be reduced by, for example, being aggregated as the same vehicle condition. Further, the data size of the parameter management information 122 may be reduced in such a method that the parameter management information 122 is set so as to gather plural vehicle types having similar vehicle behavior characteristics or the parameter management information 122 is set so as to gather plural vehicle types for each vehicle class.

Returning to the description of FIG. 1, the reference value table by vehicle type 130 is a data table that manages a reference value for each vehicle type to determine whether or not the observation value recorded in the parameter management information 122 in the map database 120 satisfies certain evaluation criteria, and is stored in a storage such as HDD or SSD. Here, the reason that the reference value is recorded for each vehicle type in the reference value table by vehicle type 130 is as follows. For example, even if the optimum suspension control parameter is set for each of a small-sized automobile and a large-sized automobile, it is considered that the riding comfort that can be actually achieved is different. Therefore, if these are evaluated using the same criteria, an appropriate evaluation result cannot be obtained. Accordingly, a reference value for evaluating the riding comfort is set for each vehicle type in the reference value table by vehicle type 130 in the embodiment, and an appropriate evaluation result can be obtained by evaluating the observation value acquired from the own vehicle using the reference value corresponding to the vehicle type of the own vehicle. It should be noted that in the above description, the difference in vehicle class such as a small-sized automobile and a large-sized automobile is described as an example of the vehicle type, but the vehicle type used for the classification of the reference value in the reference value table by vehicle type 130 is not limited to this. For example, the vehicle type in the reference value table by vehicle type 130 may be set in consideration of the characteristics of the riding comfort different for each automobile manufacturer, brand and name, and the reference value may be managed for each vehicle type. That is, the reference value table by vehicle type 130 can manage the reference values classified based on at least one of the vehicle type and the vehicle class.

FIG. 5 is a diagram for showing an example of the reference value table by vehicle type 130. In the example of the reference value table by vehicle type 130 shown in FIG. 5, a reference value is set for each combination of an automobile manufacturer and a vehicle type. That is, in the example of FIG. 5, the reference value set according to the riding comfort characterized for each vehicle type of each automobile manufacturer is recorded in the reference value table by vehicle type 130. It should be noted that the classification method of the vehicle types in the reference value table by vehicle type 130 and the reference value set for each vehicle type are not limited to the example of FIG. 5. If the reference value can be set for each vehicle type, the reference value table by vehicle type 130 can have an arbitrary data structure.

In general, it is said that when an occupant on a vehicle is continuously exposed to an irregular and unpredictable acceleration and deceleration, the semicircular canals and the vestibule are stimulated, and the human somatic sensation evokes a sense of discomfort, which causes motion sickness. For example, in a vehicle during automatic driving, it is not necessary for an occupant sitting in a driver's seat to perform a driving operation, and thus it is not necessary to always pay attention to the front. Therefore, unlike a case where the accelerator and the brake are operated by manual driving, even the occupant sitting in the driver's seat is always exposed to an unpredictable acceleration and deceleration during automatic driving, and thus it is conceivable that the occupant is likely to suffer motion sickness. In such a situation, it is conceivable that motion sickness can be reduced if the acceleration stimulus received by the occupant is 0G, that is, if the occupant does not feel the acceleration/deceleration itself. Therefore, in such a case, it is an idea to set all the reference values to 0 irrespective of a vehicle type. In this case, the information processing system 1 may not include the reference value table by vehicle type 130.

The search value table 140 is a data table used when setting a search setting value used to search for the optimum solution from the control parameters recorded in the parameter management information 122 in the map database 120, and is stored in a storage such as HDD or SSD. In the search value table 140, a search maximum value that is different for each difference value between a first evaluation value, to be described later, calculated in the first determination unit 104 of the parameter management unit 100 and the reference value is recorded. A search specification setting unit 105 of the parameter management unit 100 reads the search maximum value recorded in the search value table 140 to set the search setting value as will be described later.

FIG. 6 is a diagram for showing an example of the search value table 140. In the example of the search value table 140 shown in FIG. 6, the search maximum value is set so that as the difference value between the first evaluation value calculated in the first determination unit 104 and the reference value is larger, the search maximum value becomes larger. Conversely, as the difference value is smaller, the search maximum value becomes smaller. It should be noted that in the example shown in FIG. 6, the search maximum value is expressed by a hexadecimal number using an 8-bit digital value in each case where the difference value is 0.01, 0.05, 0.10, 0.20, 0.50, or 1.00, but the expression format of the search maximum value in the search value table 140 is not limited to this. If there is a correlation with the difference value, the search maximum value can be recorded in the search value table 140 in any expression format.

Next, each functional block of the parameter management unit 100 will be described in detail.

The vehicle information transfer unit 101 is a unit serving as a window for an inquiry about the application control parameter from the vehicle information management unit 230. When the vehicle information management unit 230 transmits the vehicle information and inquires about the application control parameter, the vehicle information transfer unit 101 transfers the received vehicle information to the data reading unit 102.

The data reading unit 102 uses the vehicle information transferred from the vehicle information transfer unit 101 as a key to search for and read the control parameter corresponding to the travel point, vehicle type, and vehicle condition of the own vehicle and the observation value associated with the control parameter from the map database 120. At this time, the data reading unit 102 determines the travel point, vehicle type, and vehicle condition of the own vehicle based on various information of the own vehicle contained in the vehicle information, for example the vehicle type code 231, vehicle position 232, vehicle speed 233, acceleration 234, and carrying capacity 235, and searches for the control parameter, observation value, and determination flag recorded therefor from the parameter management information 122 in the map database 120. Accordingly, the observation value observed when the own vehicle or another vehicle of the same vehicle type as the own vehicle ran on the same road point under the same vehicle conditions in the past and the control parameter and the determination flag corresponding to the observation value can be read from the map database 120.

When the control parameter, observation value, and determination flag are read from the map database 120 as described above, the data reading unit 102 confirms whether the value of the determination flag is "0" or "1". As a result, if the value of the determination flag is "0" (NG), the read control parameter is transferred to the parameter setting unit 107, and the observation value is transferred to the first determination unit 104. On the other hand, if the value of the determination flag is "1" (OK), the read control parameter is transferred to the parameter setting unit 107, and the observation value is not transferred to the first determination unit 104. It should be noted that in the case where there are no travel records of the own vehicle or the same vehicle type as the own vehicle and vehicles corresponding to the vehicle conditions for the travel point of the own vehicle, only the default value of the control parameter is recorded in the parameter management information 122 in the map database 120, and neither the observation value nor determination flag is recorded. Thus, in this case, both the observation value and the determination flag may be handled as 0.

It should be noted that in the case where the road surface condition at the travel point of the vehicle is used as the vehicle condition as described above, it is preferable that the data reading unit 102 estimates the road surface condition at the travel point of the own vehicle, and reads the control parameter corresponding to the estimated road surface condition, observation value, and determination flag from the parameter management information 122 in the map database 120. In this case, the road surface condition may be estimated based on, for example, information such as weather, temperature, and humidity contained in the vehicle information acquired from the own vehicle, or based on data collected from the outside via a network.

In addition, in the case where the vehicle behavior state at the travel point of the vehicle is used as the vehicle condition as described above, it is preferable that the data reading unit 102 estimates the behavior state of the own vehicle at the travel point of the own vehicle, and reads the control parameter corresponding to the estimated behavior state of the own vehicle, observation value, and determination flag from the parameter management information 122 in the map database 120. In this case, the behavior state of the own vehicle can be estimated based on, for example, information such as the steering angle, accelerator operation state, and brake operation state contained in the vehicle information acquired from the own vehicle, and the road gradient, curvature, and the like at the travel point recorded in the road information 121.

The reference value selection unit 103 reads the reference value corresponding to the own vehicle from the reference value table by vehicle type 130, and transfers the same to the first determination unit 104 and the second determination unit 108. The reference value selection unit 103 determines the vehicle type and vehicle class of the own vehicle based on the vehicle type code 231 contained in the received vehicle information in the vehicle information transfer unit 101, and searches for and reads the corresponding reference value from the reference value table by vehicle type 130. Accordingly, the reference value can be changed based on the vehicle type and vehicle class of the own vehicle when calculating a difference value between the first evaluation value to be described later and the reference value in the first determination unit 104 and when comparing a second evaluation value to be described later with the reference value in the second determination unit 108. It should be noted that in the case where automatic driving is assumed as described above, the reference value may be set to 0 regardless of the vehicle type. In this case, since the reference value selection unit 103 does not need to read the reference value from the reference value table by vehicle type 130, the reference value table by vehicle type 130 may not be provided.

The first determination unit 104 calculates the first evaluation value based on the observation value transferred from the data reading unit 102. The first evaluation value is a value for evaluating the riding comfort of the vehicle when the observation value was measured, and is calculated by summing up, for example, the absolute values of the pitch rate, roll rate, and yaw rate contained in the observation value. It should be noted that the method of calculating the first evaluation value is not limited to the above method, as long as the value can evaluate the riding comfort. For example, as described above, in the case where the vertical acceleration, the longitudinal acceleration, and the lateral acceleration of the seat installation floor measured by the floor acceleration sensor 244, the vehicle height balance measured by the vehicle height sensor, the slip amount of the wheels, and biological information of the occupants of the vehicle are included in the observation values recorded in the parameter management information 122, it is preferable to calculate the first evaluation value using these observation values.

After calculating the first evaluation value, the first determination unit 104 calculates a difference value between the calculated first evaluation value and the reference value transferred from the reference value selection unit 103. Then, the calculated difference value is transferred to the search specification setting unit 105.

The search specification setting unit 105 sets a search setting value used when the parameter setting unit 107 sets the application control parameter based on the difference value transferred from the first determination unit 104. The search specification setting unit 105 searches for and reads the search maximum value corresponding to the difference value calculated by the first determination unit 104 from the search value table 140, and sets the search setting value based on the search maximum value. A random value between −1 and +1 is randomly generated, and a result of multiplying the read search maximum value by the random value is set to the search setting value. Other than this, it is possible to set the search setting value based on the search maximum value in an arbitrary method. When the search setting value is set, the search specification setting unit 105 transfers the set search setting value to the mode switching unit 106.

In general, in an optimization problem to obtain the optimum solution by repeating a search, there are a global optimum solution that is the true optimum solution and a local optimum solution that is not necessarily the optimal solution, and there is a problem that the global optimum solution cannot be easily reached. As a method of solving this problem, it is known to first perform a coarse search over a wide area in order to predict a range in which the global optimum solution exists and then to locally perform a detailed search. In the embodiment, this method is used when the search setting value is set in the search specification setting unit 105. That is, the above coarse search corresponds to selecting a large search maximum value to set the search setting value in the search specification setting unit 105 in the case where the difference value calculated by the first determination unit 104 is large. In addition, the detailed search corresponds to selecting a small search maximum value to set the search setting value in the search specification setting unit 105 in the case where the difference value calculated by the first determination unit 104 is small.

It should be noted that in order to obtain the global optimum solution, the search specification setting unit 105 may include a mechanism for escaping from the local optimum solution by largely setting the search setting value in a mutation manner.

It should be noted that when the search specification setting unit 105 sets the search setting value, it is preferable to match the expression format of the control parameter with the expression format of the search setting value. For example, if the control parameter is expressed as an integer, the search setting value is also expressed as an integer by rounding off the numbers after the decimal point of the search setting value.

The mode switching unit 106 adjusts the search setting value transferred from the search specification setting unit 105 according to the search mode set by the search mode setting unit 221 included in the mode selection unit 220. For example, the mode switching unit 106 adjusts the search setting value by multiplying the search setting value transferred from the search specification setting unit 105 by an adjustment coefficient (0 to 1) transmitted from the search mode setting unit 221.

In the mode selection unit 220, the search mode setting unit 221 can, for example, set the search mode based on an instruction from the occupants using the operation information input by the occupants of the own vehicle as described above. Alternatively, the search mode may be set as follows. That is, although the optimum value of the application control parameter for the suspension damping force variable mechanism 211 is searched for while the own vehicle is actually running in the information processing system 1 of the embodiment, the riding comfort is not necessarily improved in this process, and there is a risk to cause car sickness instead. This becomes especially remarkable when an occupant such as an infant or a child who is prone to car sickness is on the own vehicle. Accordingly, the search mode setting unit 221 can select, for example, a car sickness prevention priority mode and a riding comfort improvement priority mode based on the presence or absence of a passenger other than the driver and the attribute of the passenger. In the case where the car sickness prevention priority mode is selected, the search mode setting unit 221 outputs, for example, "0.1" as the adjustment coefficient. In the case where the riding comfort improvement priority mode is selected, the search mode setting unit 221 outputs "1.0" as the adjustment coefficient. The adjustment coefficient output from the search mode setting unit 221 is transmitted from the mode selection unit 220 to the parameter management unit 100, and transferred to the mode switching unit 106.

The mode switching unit 106 can use the adjustment coefficient transmitted from the search mode setting unit 221 to set the search setting value suitable for each of the car sickness prevention priority mode and the riding comfort improvement priority mode. That is, in the car sickness prevention priority mode, the mode switching unit 106 adjusts the search setting value transferred from the search specification setting unit 105 to ⅒ to be transferred to the parameter setting unit 107. Accordingly, the parameter setting unit 107 can set the application control parameter by using the control parameter read from the map database 120, that is, by using a value close to the control parameter with travel records of a vehicle in the past. As a result, the behavior of the own vehicle can be suppressed within a predictable range. On the other hand, in the riding comfort improvement priority mode, the mode switching unit 106 transfers the search setting value transferred from the search specification setting unit 105 to the parameter setting unit 107 as it is without adjusting the search setting value. Accordingly, the parameter setting unit 107 can set a control parameter, which does not necessarily have travel records of a vehicle in the past, as the application control parameter. As a result, it is possible to search for the global optimum value that is the original optimum value.

As described above, one of the characteristics of the embodiment is that the optimum value of the control parameter can be searched for in consideration of various circumstances on the own vehicle side by adjusting the search setting value according to the state of the own vehicle and by setting the application control parameter using the adjusted search setting value. It should be noted that the adjustment coefficient output from the search mode setting unit 221 has been described as being two values of "0.1" and "1.0" in the above example, but other adjustment coefficients may be output. For example, the adjustment coefficient can be selected from two possible options of "0" and "1" or three possible options of "0.1", "0.5", and "1.0". Further, the specification may allow the adjustment coefficient to be selected from more options. Alternatively, the presence or absence of occupants when the own vehicle is during automatic driving, the biometric information of occupants (the movement amount of the head position, the movement amount of the center of gravity of the body, the pulse rate, the eye movement, and the like) as described above, and the driving experience of the driver are acquired, and the adjustment coefficient may be changed based on the information. In any case, it is important to be able to adjust the search setting value according to the state of the own vehicle.

In addition, although a setting example of the search mode to prevent car sickness has been described in the above example, the search mode setting unit 221 may set the search mode for other purposes. If the mode switching unit 106 can appropriately adjust the search setting value according to the state of the own vehicle, the search mode setting unit 221 can set an arbitrary search mode.

The parameter setting unit 107 sets the application control parameter for the own vehicle based on the control parameter transferred from the data reading unit 102. At this time, the parameter setting unit 107 switches the setting method of the application control parameter according to the value of the determination flag read by the data reading unit 102 together with the control parameter. That is, in the case where the value of the determination flag is "1" (OK), the control parameter transferred from the parameter setting unit 107 is set as it is as the application control parameter. On the other hand, in the case where the value of the determination flag is "0" (NG), the application control parameter is set by changing the control parameter transferred from the parameter setting unit 107 based on the adjusted search setting value transferred from the mode switching unit 106. For example, the application control parameter can be set by changing the control parameter by adding or subtracting the search setting value to or from the control parameter. It should be noted that the method of setting the application control parameter based on the search setting value is not limited to this, and the application control parameter can be set by changing the control parameter according to the search setting value by an arbitrary method.

The application control parameter set by the parameter setting unit 107 is transmitted from the parameter management unit 100 to the own vehicle, and is transferred to the suspension damping force variable mechanism 211 included in the chassis 210 of the own vehicle. Accordingly, the suspension damping force variable mechanism 211 can control the adjustment of the damping force of the suspension using the application control parameter decided by the parameter management unit 100.

When the latest observation value acquired from the own vehicle is transmitted from the observation unit 240 to the parameter management unit 100, the second determination unit 108 calculates the second evaluation value based on the observation value. As similar to the first evaluation value calculated by the above-described first determination unit 104, the second evaluation value is a value for evaluating the riding comfort of the own vehicle when the observation value is measured, and can be calculated by the same method as the first evaluation value. After calculating the second evaluation value, the second determination unit 108 compares the reference value transferred from the reference value selection unit 103 with the calculated second evaluation value, and sets the determination flag based on the comparison result. For example, in the case where a smaller value of the second evaluation value indicates that the riding comfort is better, the second determination unit 108 sets the value of the determination flag to "1" if the second evaluation value is smaller than the reference value, and sets the value of the determination flag to "0" if the second evaluation value is equal to or larger than the reference value. After setting the value of the determination flag as described above, the second determination unit 108 transfers the observation value transmitted from the observation unit 240 and the determination flag set for the observation value to the data update unit 109.

The data update unit 109 records the observation value and the determination flag transferred from the second determination unit 108, together with the application control parameter set by the parameter setting unit 107, into the parameter management information 122 in the map database 120. At this time, the data update unit 109 determines which vehicle condition the own vehicle corresponds to based on the vehicle information of the own vehicle transmitted from the vehicle information management unit 230, and records the observation value, determination flag, and application control parameter into the column corresponding to the vehicle condition of the parameter management information 122. However, the application control parameter is recorded into the parameter management information 122 in association with the observation value and the determination flag as a new control parameter after the search. Accordingly, the data update unit 109 updates the map database 120 based on the observation value acquired from the own vehicle. It should be noted that in the case where data of the observation value and the control parameter corresponding to the same vehicle condition has already been recorded in the parameter management information 122, the both data may be compared with each other, and a more appropriate control parameter, namely, the control parameter with a smaller evaluation value for the observation value may be recorded. Alternatively, the both data may be recorded together.

Figure 7:
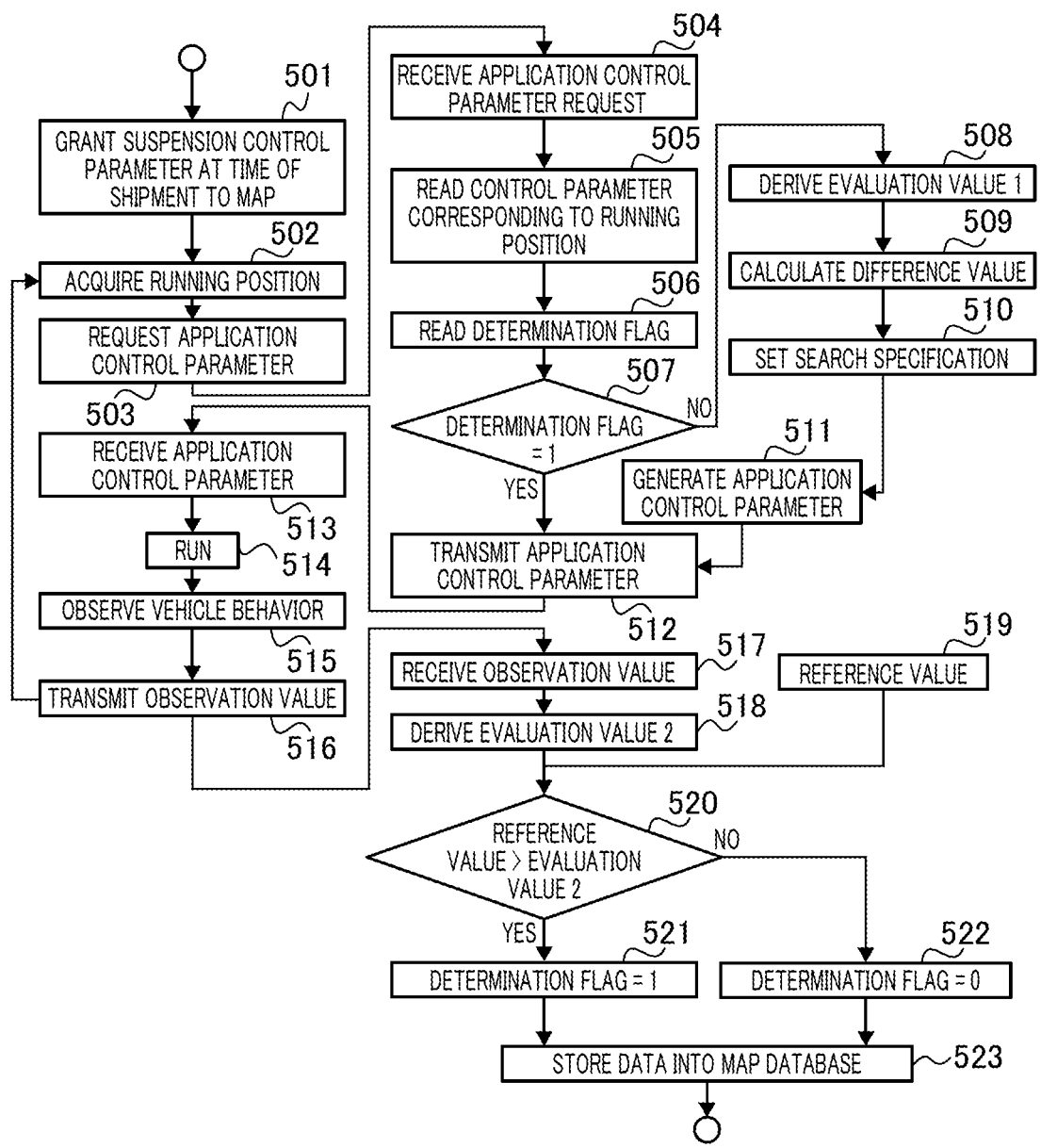
FIG. 7 is a processing flow for showing control contents in the information processing system according to the first embodiment.

Next, the control contents for improving the riding comfort when the information processing system 1 adjusts the damping force of the suspension of the own vehicle will be described. FIG. 7 is a processing flow for showing the control contents in the information processing system 1 according to the first embodiment.

First, in Step 501, the initial value of the control parameter is recorded into the parameter management information 122 in the map database 120. Here, as the initial value of the control parameter, for example, a value at the time of shipment of the product is set for each preset vehicle condition. It should be noted that the initial value of the control parameter recorded here is updated according to the subsequent process by the operation of the information processing system 1 as the own vehicle runs.

When the own vehicle starts running, the vehicle information management unit 230 acquires the running position of the own vehicle using a GPS sensor or the like in Step 502. In the following Step 503, the vehicle information management unit 230 acquires information such as the vehicle type code 231, the vehicle position 232, the vehicle speed 233, the acceleration 234, and the carrying capacity 235, and transmits the same to the parameter management unit 100 as vehicle information of the own vehicle to request the application control parameter.

When the vehicle information management unit 230 requests the application control parameter, the vehicle information transfer unit 101 receives the vehicle information of the own vehicle transmitted from the vehicle information management unit 230 as the request of the application control parameter in Step 504. Then, the vehicle information transfer unit 101 transfers the received vehicle information to the data reading unit 102.

In Step 505, the data reading unit 102 reads the control parameter corresponding to the running position of the own vehicle from the parameter management information 122 in the map database 120 based on the vehicle information transferred from the vehicle information management unit 230 in Step 504. In the following Step 506, the data reading unit 102 reads the observation value and the determination flag associated with the control parameter read in Step 505 from the parameter management information 122 in the map database 120.

In Step 507, the data reading unit 102 determines whether or not the value of the determination flag read in Step 506 is "1". In the case where the value of the determination flag is "1" (OK), the control parameter read in Step 505 is transferred to the parameter setting unit 107, and the process proceeds to Step 511. On the other hand, in the case where the value of the determination flag is not "1", namely, "0" (NG), the control parameter read in Step 505 is transferred to the parameter setting unit 107, and the observation value read in Step 506 is transferred to the first determination unit 104. Then, the process proceeds to Step 508.

In Step 508, the first determination unit 104 derives the first evaluation value based on the observation value transferred from the data reading unit 102 in Step 507, namely, the observation value acquired and recorded in the parameter management information 122 in the past. In the following Step 509, the first determination unit 104 calculates a difference value between the first evaluation value derived in Step 508 and the reference value. At this time, the reference value selection unit 103 reads the reference values corresponding to the vehicle type and the vehicle class of the own vehicle from the reference value table by vehicle type 130 as described above, and transfers the same to the first determination unit 104. The first determination unit 104 obtains a difference value between the first evaluation value obtained in Step 508 and the reference value from the reference value selection unit 103, and transfers the same to the search specification setting unit 105.

In Step 510, the search specification setting unit 105 reads the search maximum value from the search value table 140 based on the difference value between the first evaluation value and the reference value transferred from the first determination unit 104 in Step 509, and sets the search setting value. Then, the set search setting value is transferred to the mode switching unit 106.

In Step 511, the parameter setting unit 107 generates the application control parameter based on the control parameter transferred from the data reading unit 102 in Step 507 and the search setting value transferred from the search specification setting unit 105 to the mode switching unit 106 in Step 510. At this time, the mode switching unit 106 adjusts the search setting value according to the search mode set by the search mode setting unit 221 as described above, and transfers the result to the parameter setting unit 107. The parameter setting unit 107 generates the application control parameter by changing the control parameter using the adjusted search setting value transferred from the mode switching unit 106.

In Step 512, the parameter management unit 100 transmits the control parameter (when the determination flag is "1") transferred from the data reading unit 102 to the parameter setting unit 107 in Step 507 or the application control parameter (when the determination flag is "0") generated by the parameter setting unit 107 in Step 511 to the own vehicle as the application control parameter for the own vehicle.

When the application control parameter transmitted from the parameter management unit 100 in Step 512 is received by the own vehicle in Step 513, the suspension damping force variable mechanism 211 adjusts the damping force of the suspension using the application control parameter. Thereafter, when the own vehicle actually runs with the suspension after adjusting the damping force in Step 514, the observation unit 240 observes the behavior when the own vehicle runs in Step 515. Then, in the following Step 516, the observation unit 240 transmits the observation value obtained in Step 515 to the parameter management unit 100. Thereafter, the flow returns to Step 502 to repeat the process in the own vehicle.

When the observation unit 240 transmits the observation value, the parameter management unit 100 receives the observation value transmitted from the observation unit 240 in Step 517. Then, the received observation value is transferred to the second determination unit 108.

In Step 518, the second determination unit 108 derives the second evaluation value based on the observation value received in Step 517, namely, the latest observation value acquired in the own vehicle. In Step 519, the reference value selection unit 103 reads the reference values corresponding to the vehicle type and the vehicle class of the own vehicle from the reference value table by vehicle type 130, and transfers the same to the second determination unit 108.

In Step 520, the second determination unit 108 compares the second evaluation value obtained in Step 518 with the reference value transferred from the reference value selection unit 103 in Step 519. As a result, if the second evaluation value is smaller than the reference value, the process proceeds to Step 521. If the second evaluation value is equal to or larger than the reference value, the process proceeds to Step 522.

In Step 521, the second determination unit 108 sets the value of the determination flag to "1". In Step 522, the second determination unit 108 sets the value of the determination flag to "0". When the determination flag is set in Step 521 or 522, the second determination unit 108 transfers the set determination flag and the observation value to the data update unit 109, and the process proceeds to Step 523.

In Step 523, the data update unit 109 stores the determination flag and the observation value transferred from the second determination unit 108 in Step 521 or 522 and the application control parameter set by the parameter setting unit 107 in Step 511 into the parameter management information 122 of the map database 120. Accordingly, the map database 120 is updated. After performing the process of Step 523, the information processing system 1 terminates the processing flow of FIG. 7, and waits until the start of the next control.

The information processing system 1 of the embodiment repeats the control as described above to search for the control parameter for the own vehicle so that the value of the determination flag stored in the parameter management information 122 in the map database 120 becomes "1" (OK). In this search, the observation value related to the vehicle behavior is acquired from the own vehicle by setting the application control parameter for the own vehicle and by observing the vehicle behavior when the own vehicle for which the control of the suspension damping force variable mechanism 211 is performed is actually allowed to run using the application control parameter. Then, the evaluation value is derived based on the acquired observation value, and whether or not the application control parameter is applied is determined using the evaluation value. By repeating such a series of processes, the search of the optimum control parameter for the own vehicle can be realized. Further, it is also possible to perform the search process for plural vehicles in parallel. Accordingly, the time required for the control parameter to reach the optimum solution can be shortened.

Second Embodiment

A second embodiment of the present invention will be described below using FIG. 8 to FIG. 10. In the embodiment, an example in which whether or not the control parameter is the optimum solution is determined by a method different from that of the first embodiment will be described.

Figure 8:
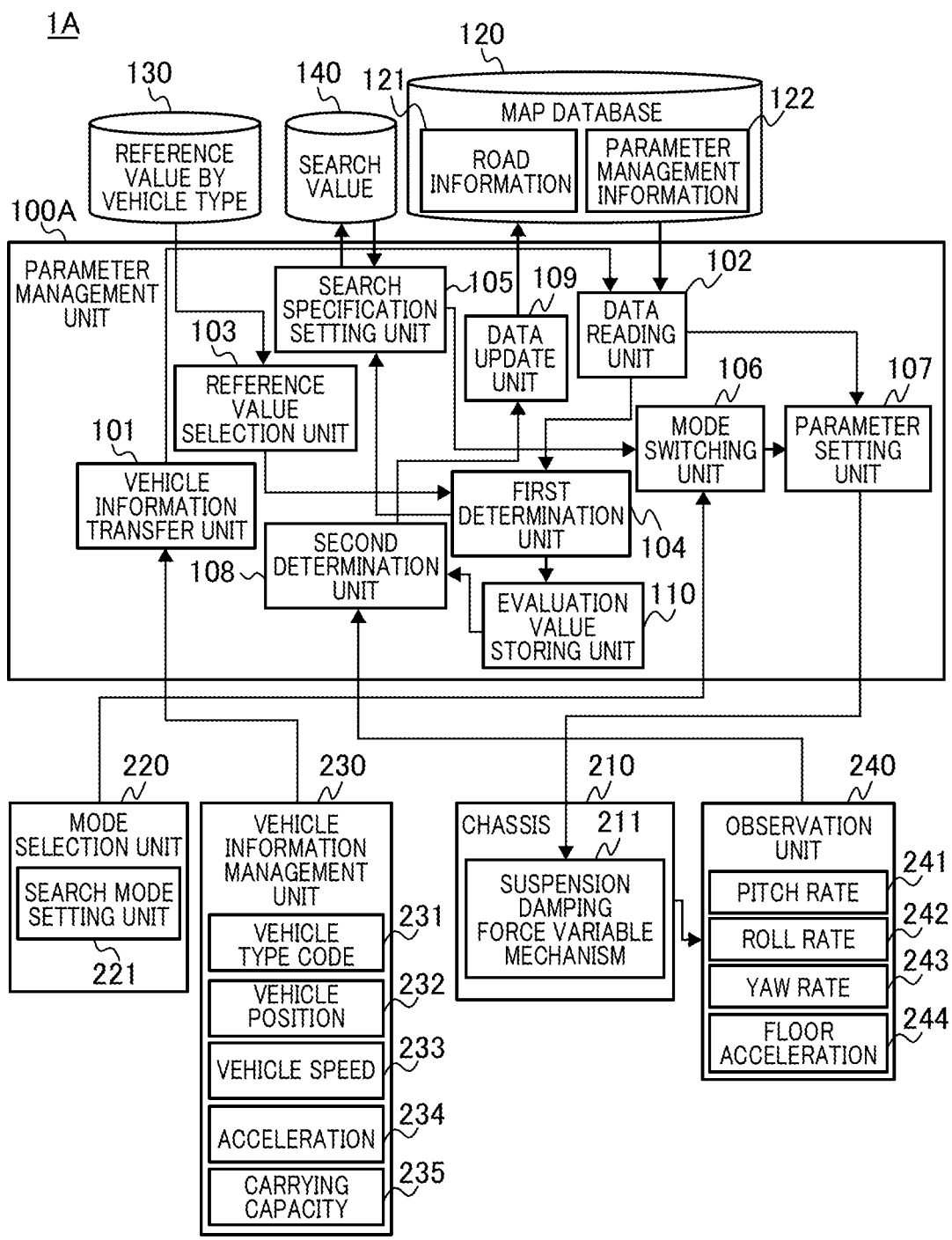
FIG. 8 is a block diagram for showing a functional configuration of an information processing system according to a second embodiment.

FIG. 8 is a block diagram for showing a functional configuration of an information processing system according to the second embodiment. An information processing system 1A shown in FIG. 8 is a system used to improve the riding comfort felt by occupants of the own vehicle by adjusting the damping force of a suspension mounted on the own vehicle as similar to the information processing system 1 described in the first embodiment. The information processing system 1A has the same functional configuration as the information processing system 1 shown in FIG. 1 except that the information processing system 1A has a parameter management unit 100A instead of the parameter management unit 100 of FIG. 1.

In addition to the vehicle information transfer unit 101, the data reading unit 102, the reference value selection unit 103, the first determination unit 104, the search specification setting unit 105, the mode switching unit 106, the parameter setting unit 107, the second determination unit 108, and the data update unit 109 described in the first embodiment, the parameter management unit 100A further includes an evaluation value storing unit 110. In the parameter management unit 100A, when the first determination unit 104 calculates the above-described first evaluation value, the value is transferred to the evaluation value storing unit 110.

The evaluation value storing unit 110 temporarily stores the first evaluation value transferred from the first determination unit 104. When the control of the suspension damping force variable mechanism 211 based on the application control parameter is performed in the own vehicle and the observation value transmitted from the observation unit 240 is accordingly received in the parameter management unit 100A, the evaluation value storing unit 110 transfers the stored first evaluation value to the second determination unit 108.

In the parameter management unit 100A, after calculating the above-described second evaluation value, the second determination unit 108 sets the determination flag using the first evaluation value transferred from the evaluation value storing unit 110 instead of the reference value transferred from the reference value selection unit 103. At this time, the second determination unit 108 can set the determination flag by calculating a pass/fail determination value using, for example, a method called reinforcement learning. For example, in the case where a smaller value of the first evaluation value or the second evaluation value indicates that the riding comfort is better, the second determination unit 108 adds the value corresponding to a reward to the pass/fail determination value if the second evaluation value is smaller than the first evaluation value. On the contrary, if the second evaluation value is equal to or larger than the first evaluation value, the second determination unit 108 subtracts the value corresponding to a penalty from the pass/fail determination value. When the pass/fail determination value thus calculated is equal to or larger than a predetermined pass/fail reference value, it is determined that the optimum solution has been obtained for the control parameter, and the value of the determination flag is changed from "0" to "1" to terminate the search for the optimum solution. It should be noted that the pass/fail reference value described above differs depending on the suspension characteristics of the own vehicle to be controlled and the specifications of the values corresponding to the above-described reward and penalty, and thus can be preferably adjusted.

FIG. 9 is a diagram for showing an example of the parameter management information 122 according to the second embodiment. In the embodiment, a column of the pass/fail determination value is further added in the parameter management information 122 as shown in FIG. 9, as compared with the first embodiment described in FIG. 4. The column of the pass/fail determination value shows the current pass/fail determination value calculated by repeating addition and subtraction of the values corresponding to the reward and penalty to and from the control parameter value set for each vehicle condition.

Figure 10:
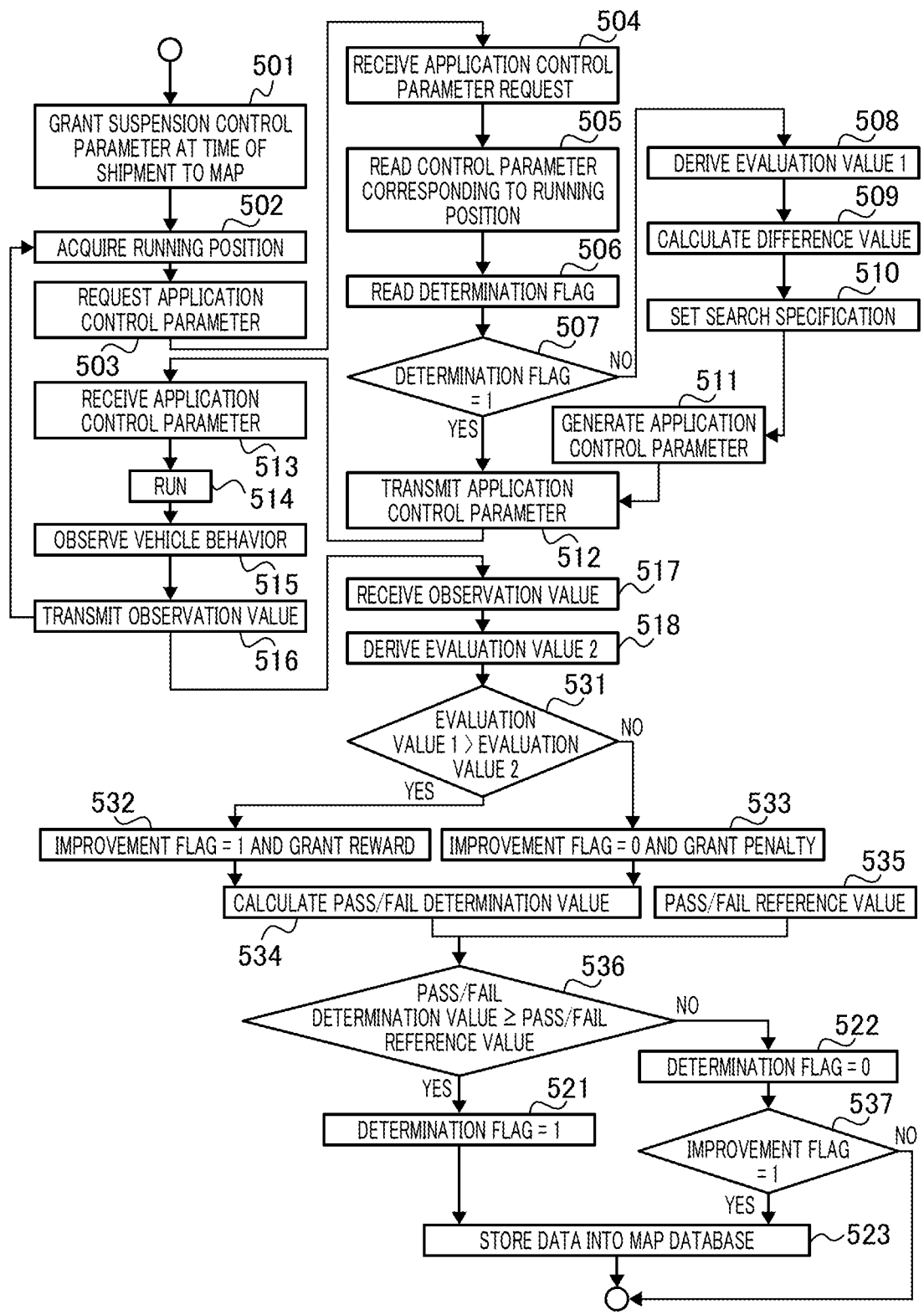
FIG. 10 is a processing flow for showing control contents in the information processing system according to the second embodiment.

FIG. 10 is a processing flow for showing control contents in the information processing system 1A according to the second embodiment. In Steps 501 to 518 in the processing flow of FIG. 10, the same processes as those of the processing flow of FIG. 7 described in the first embodiment are executed. However, after deriving the first evaluation value, the first determination unit 104 transfers and stores the first evaluation value to the evaluation value storing unit 110 in Step 508.

After deriving the second evaluation value in Step 518, the second determination unit 108 reads the first evaluation value stored in the evaluation value storing unit 110, and compares the second evaluation value obtained in Step 518 with the read first evaluation value in Step 531. As a result, if the second evaluation value is smaller than the first evaluation value, the process proceeds to Step 532. If the second evaluation value is equal to or larger than the first evaluation value, the process proceeds to Step 533.

In Step 532, the second determination unit 108 sets the value of an improvement flag to "1" (improved), reads the pass/fail determination value recorded in the parameter management information 122, and grants a reward to the pass/fail determination value. In Step 533, the second determination unit 108 sets the value of the improvement flag to "0" (not improved), reads the pass/fail determination value recorded in the parameter management information 122, and grants a penalty to the pass/fail determination value. After setting the improvement flag and granting the reward or penalty to the pass/fail determination value in Step 532 or 533, the second determination unit 108 proceeds to the next Step 534. It should be noted that the improvement flag to which "1" or "0" is set in Step 532 or 533 is a flag indicating whether or not the riding comfort has been improved by the application control parameter transmitted to the own vehicle in Step 512, and is temporarily stored in the second determination unit 108. If the second evaluation value is smaller than the first evaluation value in Steps 531 to 533, the second determination unit 108 determines that the riding comfort has been improved, and sets the improvement flag to "1". If the second evaluation value is equal to or larger than the first evaluation value, the second determination unit 108 determines that the riding comfort has not been improved, and sets the improvement flag to "0".

In Step 534, the second determination unit 108 calculates the pass/fail determination value with the reward or penalty granted in Step 532 or 533. In Step 535, the second determination unit 108 reads the preset pass/fail reference value. In Step 536, the second determination unit 108 compares the pass/fail determination value calculated in Step 534 with the pass/fail reference value read in Step 535. As a result, if the pass/fail determination value is equal to or larger than the pass/fail reference value, the process proceeds to Step 521. If the pass/fail determination value is smaller than the pass/fail reference value, the process proceeds to Step 522.

In Step 521, the second determination unit 108 sets the value of the determination flag to "1", transfers the set determination flag and the observation value to the data update unit 109, and proceeds to Step 523. In Step 522, the second determination unit 108 sets the value of the determination flag to "0". In the following Step 537, the second determination unit 108 determines whether or not the value of the improvement flag set in Step 532 or 533 is "1". If the value of the improvement flag is "1", the set determination flag and the observation value are transferred to the data update unit 109, and the process proceeds to Step 523.

In Step 523, the data update unit 109 stores the determination flag and the observation value transferred from the second determination unit 108 in Step 521 or 537 and the application control parameter set by the parameter setting unit 107 in Step 511 into the parameter management information 122 of the map database 120. Accordingly, the map database 120 is updated. After performing the process of Step 523, the information processing system 1A terminates the processing flow of FIG. 10, and waits until the start of the next control. On the other hand, in the case where the value of the improvement flag is "0" in Step 537, the information processing system 1A terminates the processing flow of FIG. 10 without updating the map database 120, and waits until the start of the next control.

The information processing system 1A of the embodiment determines whether or not the riding comfort of the own vehicle has been improved by the application control parameter based on the magnitude relationship between the first evaluation value and the second evaluation value, and grants a reward or penalty by performing the control as described above. Reinforcement learning through such a series of processes is repeated to obtain the pass/fail determination value, and the determination flag is set based on the pass/fail determination value, so that a search for the optimum control parameter for the own vehicle can be realized.

Third Embodiment

A third embodiment of the present invention will be described below using FIG. 11. In the embodiment, a concrete example of a hardware configuration that realizes the system configuration described in the first embodiment will be described.

Figure 11:
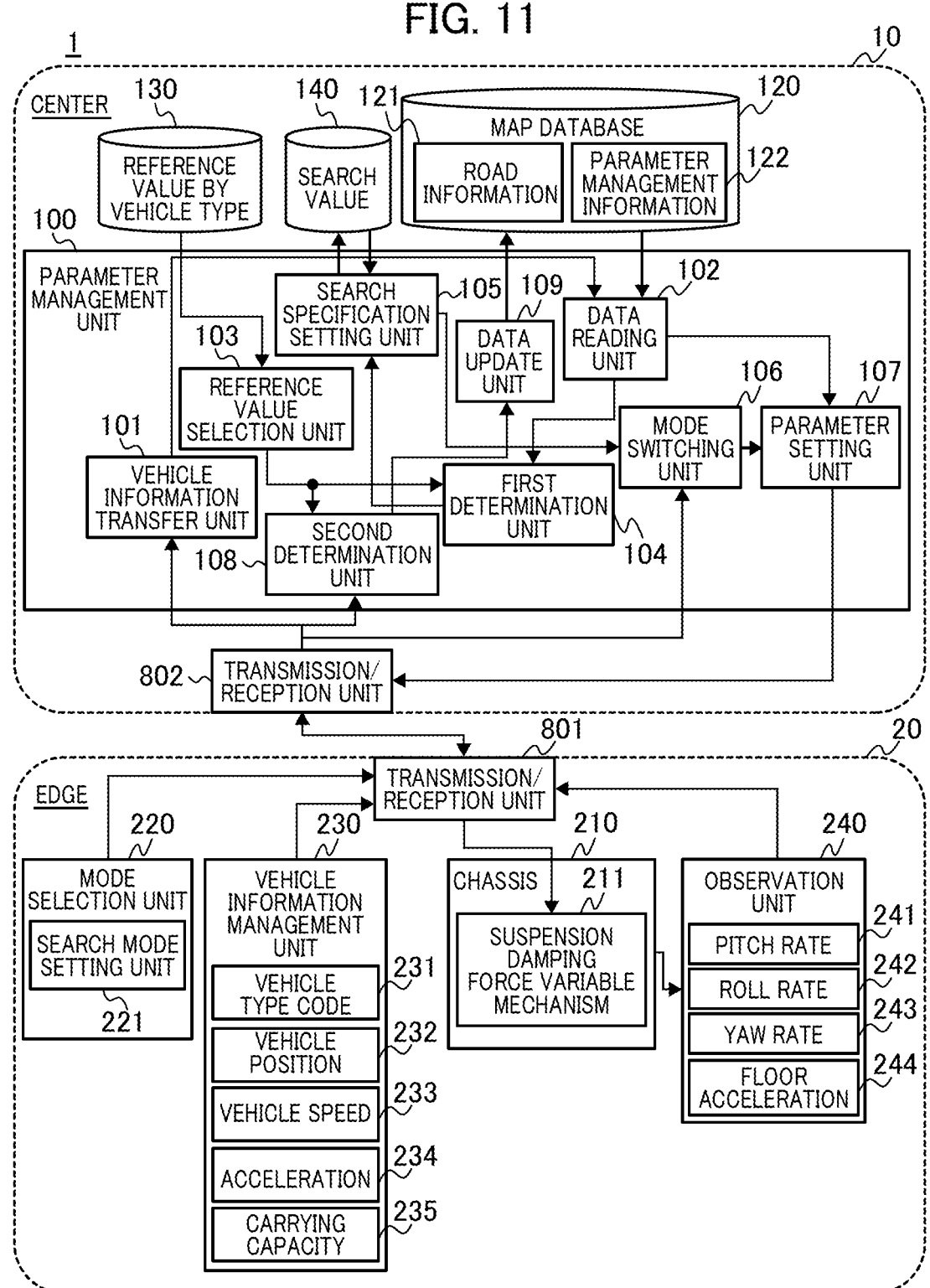
FIG. 11 is a block diagram for showing a functional configuration of an information processing system according to a third embodiment.

FIG. 11 is a block diagram for showing a functional configuration of an information processing system according to the third embodiment. The information processing system shown in FIG. 11 is realized by configuring the information processing system 1 described in the first embodiment using a server 10 that is an information processing device installed on the center side and an onboard device 20 mounted on the own vehicle as an information processing device on the edge side. The server 10 and the onboard device 20 are connected to each other via a wireless communication network such as a mobile phone, and mutually transmit and receive data. Accordingly, based on the information from the own vehicle, the process as described in the first embodiment is performed in the parameter management unit 100, and the control parameter is optimized for the suspension damping force of the own vehicle.

The onboard device 20 and the server 10 include transmission/reception units 801 and 802, respectively. The transmission/reception unit 801 operates as an edge-side interface, and functions to connect a network such as CAN in the own vehicle to the server 10 via a wireless communication network. The transmission/reception unit 802 operates as a center-side interface, and functions to connect a network in the server 10 to plural own vehicles.

The embodiment is characterized in that the server 10 on the center side is provided with the map database 120, but there are various management methods. For example, there is a case that a country has one server, or a country is divided into plural areas each of which is managed by a different server so that the database is managed by plural servers in a country unit. In addition, in the case where the database is managed by plural servers, it is conceivable to overlap some of the areas managed by each server, or to set up a supervisory server that supervises plural servers in order to avoid failures of data transfer in a boundary area. In any case, it is important to be able to share information stored in the map database 120 when the own vehicle runs in each location. If this can be realized, any data management method on the center side can be used.

With the configuration as described above, the information processing system of the embodiment searches for the control parameter so that the value of the determination flag stored in the parameter management information 122 in the map database 120 is "1" (OK) while sharing the map database 120 among plural vehicles. Therefore, it is possible to establish an information processing system that can search for the optimum control parameter for each of plural vehicles.

Fourth Embodiment

A fourth embodiment of the present invention will be described below using FIG. 12. In the embodiment, another concrete example of a hardware configuration that realizes the system configuration described in the first embodiment will be described.

Figure 12:
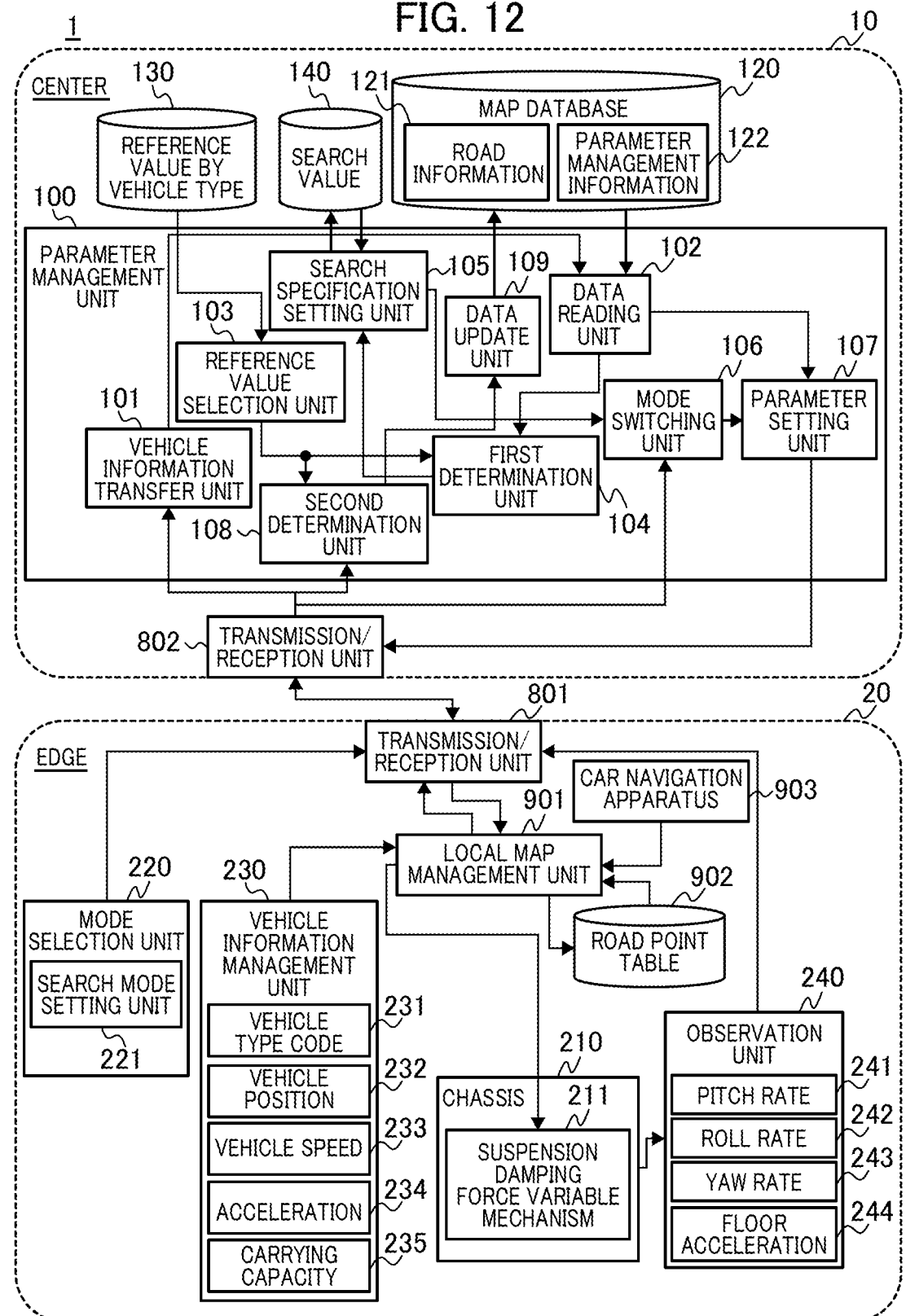
FIG. 12 is a block diagram for showing a functional configuration of an information processing system according to a fourth embodiment.

FIG. 12 is a block diagram for showing a functional configuration of an information processing system according to the fourth embodiment. As similar to the third embodiment, the information processing system shown in FIG. 12 is realized by configuring the information processing system 1 described in the first embodiment using a server 10 that is an information processing device installed on the center side and an onboard device 20 mounted on the own vehicle as an information processing device on the edge side. The onboard device 20 has a local map management unit 901, a road point table 902, and a car navigation apparatus 903 in addition to each functional block of the chassis 210, the mode selection unit 220, the vehicle information management unit 230, and the observation unit 240 described in the first embodiment and the transmission/reception unit 801 described in the third embodiment.

In the embodiment, while the map database 120 on the center side manages map data over a wide area, the onboard device 20 on the edge side manages map data over a narrow area near the travel location of the own vehicle. Therefore, the onboard device 20 includes the road point table 902 for storing map data in a narrow area near the travel location of the own vehicle and the local map management unit 901 for managing the map data stored in the road point table 902.

The local map management unit 901 acquires positional information of the own vehicle from the vehicle information management unit 230, and acquires, based on the positional information, information of a narrow range based on the position of the own vehicle of the road information 121 and the parameter management information 122 stored in the map database 120 of the server 10 from the parameter management unit 100 via the transmission/reception unit 801. At this time, the local map management unit 901 downloads the information acquired from the parameter management unit 100 from the server 10 via wireless communications performed via the transmission/reception units 801 and 802. Then, the acquired information is stored in the road point table 902 so that the control parameter according to the travel point of the own vehicle can be acquired without making an inquiry to the server 10.

When the own vehicle runs and the position thereof changes, the local map management unit 901 refers to the information stored in the road point table 902 to acquire the control parameter, and outputs the same to the chassis 210. In the chassis 210, the suspension damping force variable mechanism 211 is operated using the control parameter transmitted from the local map management unit 901, and the suspension damping force of the own vehicle is adjusted.

The road point table 902 is table data established using information acquired by the local map management unit 901 from the parameter management unit 100, namely, some of the road information 121 and the parameter management information 122 recorded in the map database 120. The road point table 902 has the same data configuration as the road information 121 and the parameter management information 122 shown in FIG. 3 and FIG. 4 of the first embodiment, respectively. It should be noted that the information stored in the road point table 902 is limited to a fixed narrow range based on the position of the own vehicle as described above. Therefore, the local map management unit 901 transmits a request to update the road point table 902 to the server 10, and acquires new information from the parameter management unit 100 before the own vehicle reaches an area outside the map range where information is stored in the road point table 902.

In addition, there is a possibility that illegal information is stored in the road point table 902 because some information is missing or old and new information is mixed and stored due to trouble at the time of updating information. Therefore, it is preferable that the road point table 902 is provided with measures to avoid such illegal information. Specifically, a storage device configuring the road point table 902 is configured to have a dual configuration, one storage device is set to store pre-update information, and the other storage device is set to store new information. Then, when the storage of new information is normally completed, the local map management unit 901 switches the information to be referred to in the road point table 902 when the control parameter is set. Accordingly, even if the road point table 902 is being updated, the local map management unit 901 can acquire appropriate data without confusion.

The car navigation apparatus 903 acquires destination information of the own vehicle, and outputs the same to the local map management unit 901, so that a linkage operation with the local map management unit 901 is performed. The information stored in the road point table 902 is limited to a fixed narrow range based on the position of the own vehicle as described above. Therefore, by operating the car navigation apparatus 903 in cooperation, the local map management unit 901 can limit the area range stored in the road point table 902 by acquiring information from the parameter management unit 100 to an area around the destination route of the own vehicle. Accordingly, the amount of information downloaded from the server 10 can be limited to an appropriate range, and an efficient data operation can be realized. It should be noted that in the case where the own vehicle runs out of the route set by the car navigation apparatus 903, the car navigation apparatus 903 searches for the route again, and may download the information again from the server 10 in the range of the obtained route.

Alternatively, in the case where the destination route of the own vehicle is not considered, the car navigation apparatus 903 may not be operated in cooperation with the local map management unit 901. For example, the information may be downloaded from the server 10 within a radius of 10 km based on the position of the own vehicle. In this case, if the average speed of the own vehicle is, for example, 40 km/h, the frequency of requesting an information update from the local map management unit 901 to the server 10 is about once every 15 minutes.

With the configuration as described above, the information processing system of the embodiment can search for the optimum control parameter in the own vehicle without making an inquiry to the server 10 every time.

Fifth Embodiment

A fifth embodiment of the present invention will be described below using FIG. 13. In the embodiment, still another concrete example of a hardware configuration that realizes the system configuration described in the first embodiment will be described.

Figure 13:
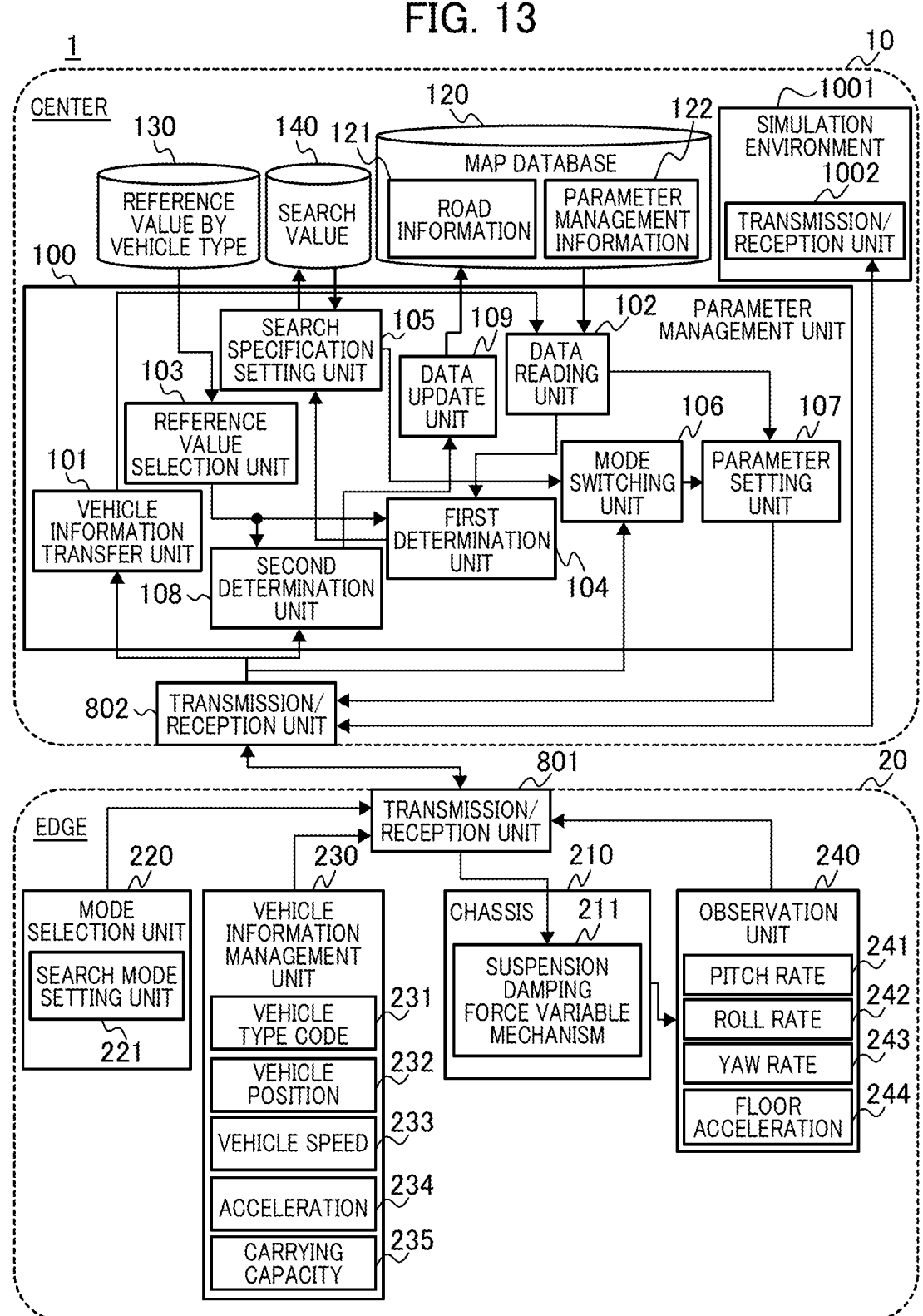
FIG. 13 is a block diagram for showing a functional configuration of an information processing system according to a fifth embodiment.

FIG. 13 is a block diagram for showing a functional configuration of an information processing system according to the fifth embodiment. As similar to the third and fourth embodiments, the information processing system shown in FIG. 13 is realized by configuring the information processing system 1 described in the first embodiment using a server 10 that is an information processing device installed on the center side and an onboard device 20 mounted on the own vehicle as an information processing device on the edge side. The server 10 has a simulation environment 1001 in addition to each functional block of the parameter management unit 100, the map database 120, the reference value table by vehicle type 130, and the search value table 140 described in the first embodiment and the transmission/reception unit 802 described in the third embodiment.

In the embodiment, a virtual environment is combined with an actual vehicle on the center side to search for the optimum control parameter. Specifically, in the server 10 on the center side, the simulation environment 1001 sets a virtual environment having map information expressed for each road point, road surface profile information reproducing the height and inclination of a road surface and the surface shape of a road, and a vehicle model capable of reproducing vehicle behavior. Then, under the simulation environment 1001, the optimum control parameter is derived by repeating the observation of the traveling of the vehicle model and the vehicle behavior plural times when the control parameter is set.

As described above, the simulation environment 1001 is a virtual environment capable of reproducing the vehicle behavior when the vehicle actually runs, and has a road surface profile representing the shape of a road surface in addition to the map information representing a road configuration. It should be noted that the road surface profile is configured using, for example, displacement in the vertical direction for each XY coordinate, and is set based on a measurement value at the time of, for example, road design or completion of the road.

The vehicle model in the simulation environment 1001 is a model of a vehicle on which the onboard device 20 is mounted. For example, if the vehicle has four wheels, a chassis assuming four wheels is represented by the vehicle model. Ideally, a vibration transmission route in which vibrations from a road surface input via tires are transmitted to a seat where an occupant sits via each component of the chassis is reproduced by the vehicle model. The vehicle model may reproduce a vibration transmission route to a steering wheel grasped by an occupant.

The simulation environment 1001 has a transmission/reception unit 1002 that functions as an interface with the parameter management unit 100. The transmission/reception unit 1002 receives information necessary for a simulation in the simulation environment 1001 from the parameter management unit 100 via the transmission/reception unit 802, and transmits the simulation result in the simulation environment 1001 to the parameter management unit 100 via the transmission/reception unit 802. It should be noted that the transmission/reception unit 1002 and the parameter management unit 100 may be connected to each other in a wired or wireless manner.

With the configuration as described above, the information processing system of the embodiment can search for the optimum control parameter by running the vehicle model under the simulation environment 1001. Therefore, it is not necessary to consider the convenience of an occupant who drives the vehicle unlike the real world, and the vehicle behavior at an arbitrary road point is acquired and can be reflected on the search for the control parameter. In addition, by performing the simulation calculation at a high speed, it is possible to obtain the optimum solution of the control parameter in a significantly shorter time than when the vehicle is actually allowed to run.

It should be noted that in the third to fifth embodiments described above, the examples of the hardware configuration for realizing the system configuration according to the first embodiment are shown. However, the system configuration according to the second embodiment may be realized. That is, the system configuration according to the second embodiment can be realized using the hardware configuration same as those shown in FIG. 11 to FIG. 13.

According to the embodiments of the present invention described above, the following advantageous effects can be obtained.

(1) A server 10 is connected to the own vehicle via a network. The server 10 includes a map database 120 in which a control parameter for controlling the behavior of the own vehicle is recorded for each vehicle type at each point on a road, a data reading unit 102, a parameter setting unit 107, and a data update unit 109. The data reading unit 102 acquires vehicle information including at least vehicle type information and positional information of the own vehicle from a vehicle information management unit 230 and reads the control parameter corresponding to the travel point of the own vehicle from the map database 120 based on the vehicle information. The parameter setting unit 107 sets an application control parameter to be applied to control of the own vehicle based on the control parameter read by the data reading unit 102. The data update unit 109 acquires an observation value related to the behavior of the own vehicle controlled based on the application control parameter from the own vehicle, and updates the map database 120 based on the observation value. Thus, the riding comfort of occupants on the vehicle can be improved.

(2) A suspension capable of controlling damping force is mounted on the own vehicle. The control parameter and the application control parameter are parameters used in controlling the damping force of the suspension. Thus, it is possible to improve the riding comfort of the occupants by appropriately controlling the damping force of the suspension in the vehicle.

(3) The observation value acquired in the past is recorded in the map database 120 in association with the control parameter. The data reading unit 102 reads the control parameter and the observation value corresponding to the travel point of the own vehicle from the map database 120. The parameter setting unit 107 sets the application control parameter based on the control parameter and the observation value read by the data reading unit 102. Specifically, the server 10 includes a first determination unit 104 and a search specification setting unit 105. The first determination unit 104 calculates a first evaluation value based on the observation value read by the data reading unit 102, and calculates a difference value between the first evaluation value and a predetermined reference value. The search specification setting unit 105 sets a search setting value based on the difference value calculated by the first determination unit 104. The parameter setting unit 107 sets the application control parameter by changing the control parameter read by the data reading unit 102 based on the search setting value. Thus, it is possible to appropriately set the application control parameter from the control parameter using the observation value acquired in the past.

(4) The server 10 includes a second determination unit 108. The second determination unit 108 calculates a second evaluation value based on the latest observation value acquired from the own vehicle, and sets a determination flag based on a comparison result between the first evaluation value and the second evaluation value. The data update unit 109 updates the map database 120 by recording the application control parameter in the map database 120 as a new control parameter and recording the determination flag in the map database 120 in association with the control parameter. Thus, it is possible to appropriately update the map database 120 from the behavior of the own vehicle when the application control parameter is set.

(5) The second determination unit 108 can also set the determination flag by repeatedly performing reinforcement learning to grant a reward or penalty based on the magnitude relationship between the first evaluation value and the second evaluation value. Thus, it is possible to more certainly obtain the optimum solution of the control parameter.

(6) The server 10 can share the control parameter among a plurality of vehicles having the same vehicle type when being connected to the vehicles via the network. Thus, it is possible to obtain the optimum solution of the control parameter in a short period of time.

(7) The control parameter is recorded in the map database 120 for each preset vehicle condition. The data reading unit 102 reads the control parameter corresponding to the travel point of the own vehicle and the vehicle condition from the map database 120. Thus, it is possible to set the application control parameter to the own vehicle using the optimum control parameter according to the situation of the own vehicle.

(8) The above-described vehicle conditions can include at least any one of a vehicle type, a vehicle speed, an acceleration, a carrying capacity, a road inclination, weather, temperature, humidity, a road surface condition, a steering angle, an accelerator operation state, and a brake operation state. In addition, the vehicle conditions include a road surface condition. The data reading unit 102 estimates the road surface condition at a travel point of the own vehicle, and can read the control parameter corresponding to the estimated road surface condition from the map database 120. Further, the vehicle conditions include a vehicle behavior state. The data reading unit 102 estimates the behavior state of the own vehicle at a travel point of the own vehicle, and can read the control parameter corresponding to the estimated behavior state of the own vehicle from the map database 120. Thus, it is possible to appropriately classify the control parameters recorded in the map database 120 using an arbitrary vehicle condition.

(9) The observation values can include at least any one of a roll rate, a pitch rate, and a yaw rate of the own vehicle, a vertical acceleration, a longitudinal acceleration, and a lateral acceleration of a seat installation floor of the own vehicle, and biological information of an occupant of the own vehicle. Thus, an arbitrary observation value is acquired according to the behavior state of the vehicle, and it is possible to set the application control parameter and to update the map database 120.

(10) The first determination unit 104 changes the reference value used to calculate the difference value from the first evaluation value based on at least one of the vehicle type and the vehicle class of the own vehicle. Thus, it is possible to set an appropriate search setting value from the calculated difference value.

(11) The server 10 includes a mode switching unit 106 for adjusting the search setting value according to the state of the own vehicle. Specifically, the mode switching unit 106 can adjust the search setting value based on at least any one of an instruction from the occupant of the own vehicle, the presence or absence of a passenger other than the driver of the own vehicle, attributes of the passenger, the presence or absence of the occupant when the own vehicle is in automatic driving, biological information of the occupant, and driving experience of the driver. Thus, it is possible to search for the optimum solution of the control parameter by appropriately setting the search setting value.

It should be noted that an example of searching for the optimum solution for the control parameter to control the damping force of the suspension has been described in each of the embodiments described above, but the present invention is not limited thereto. The present invention can be applied if the optimum solution is searched for the control parameter for controlling the behavior of the vehicle.

The embodiments and various modified examples described above are merely examples, and the present invention is not limited to these contents as long as the characteristics of the invention are not impaired. In addition, although various embodiments and modified examples have been described above, the present invention is not limited to these contents. The other aspects considered within the scope of the technical idea of the present invention are also included within the scope of the present invention.

The content disclosed in the following priority basic application is herein incorporated by reference.

Japanese Patent Application 2018-151282 (filed on Aug. 10, 2018)

LIST OF REFERENCE SIGNS 1, 1A information processing system
10 server
20 onboard device
100 parameter management unit
101 vehicle information transfer unit
102 data reading unit
103 reference value selection unit
104 first determination unit
105 search specification setting unit
106 mode switching unit
107 parameter setting unit
108 second determination unit
109 data update unit
110 evaluation value storing unit
120 map database
121 road information
122 parameter management information
130 reference value table by vehicle type
140 search value table
210 chassis
211 suspension damping force variable mechanism
220 mode selection unit
221 search mode setting unit
230 vehicle information management unit
240 observation unit

The invention claimed is:

1. An information processing device that is connected to a vehicle via a network, comprising:
a map database in which a control parameter for controlling the behavior of the vehicle is recorded for a vehicle type at a travel point on a road, wherein
the vehicle type is set in consideration of the characteristics of the riding comfort for automobile manufacturers or brand and names;
a data reading unit that acquires vehicle information including at least vehicle type information and positional information of the vehicle and reads the control parameter corresponding to the travel point of the vehicle from the map database based on the vehicle information;
a parameter setting unit that sets an application control parameter to be applied to control of the vehicle based on the control parameter read by the data reading unit; and
a data update unit that acquires an observation value related to the behavior of the vehicle controlled based on the application control parameter from the vehicle and updates the map database based on the observation value wherein
- a determination flag is given to the control parameter to indicate whether or not the control parameter has been obtained as an optimum solution;
- if the determination flag indicating that the control parameter has been obtained as an optimum solution is given to the control parameter, the data update unit does not update the map database based on the observation value acquired from the vehicle; and
- if the determination flag indicating that the control parameter has not been obtained as an optimum solution is given to the control parameter, the data update unit updates the map database based on the observation value acquired from the vehicle.

2. The information processing device according to claim 1,
- wherein a suspension capable of controlling damping force is mounted on the vehicle, and
- wherein the control parameter and the application control parameter are parameters used in controlling the damping force of the suspension.

3. The information processing device according to claim 1,
- wherein the observation value is recorded in the map database in association with the control parameter,
- wherein the data reading unit reads the control parameter and the observation value corresponding to the travel point of the vehicle from the map database, and
- wherein the parameter setting unit sets the application control parameter based on the control parameter and the observation value read by the data reading unit corresponding to the travel point of the vehicle from the map database.

4. The information processing device according to claim 3, comprising:
- a first determination unit that calculates a first evaluation value based on the observation value read by the data reading unit and calculates a difference value between the first evaluation value and a predetermined reference value; and
- a search specification setting unit that sets a search setting value based on the difference value calculated by the first determination unit,
- wherein the parameter setting unit sets the application control parameter by changing the control parameter read by the data reading unit based on the search setting value.

5. The information processing device according to claim 4, comprising a second determination unit that calculates a second evaluation value based on the latest observation value acquired from the vehicle and sets a determination flag based on a comparison result between the first evaluation value and the second evaluation value,
- wherein the data update unit updates the map database by recording the application control parameter in the map database as a new control parameter and recording the determination flag in the map database in association with the control parameter.

6. The information processing device according to claim 5,
- wherein the second determination unit sets the determination flag by repeatedly performing reinforcement learning to grant a reward or penalty based on the magnitude relationship between the first evaluation value and the second evaluation value.

7. The information processing device according to claim 1,
- wherein the control parameter is shared among a plurality of vehicles having the same vehicle type when being connected to the vehicles via the network.

8. The information processing device according to claim 1,
- wherein the control parameter is recorded in the map database for a preset vehicle condition, and
- wherein the data reading unit reads the control parameter corresponding to the travel point of the vehicle and stored vehicle conditions from the map database.

9. The information processing device according to claim 8,
- wherein the vehicle conditions include at least any one of a vehicle type, a vehicle speed, an acceleration, a carrying capacity, a road inclination, weather, temperature, humidity, a road surface condition, a steering angle, an accelerator operation state, and a brake operation state.

10. The information processing device according to claim 8,
- wherein the vehicle conditions include a road surface condition, and
- wherein the data reading unit estimates the road surface condition at the travel point of the vehicle and reads the control parameter corresponding to the estimated road surface condition from the map database.

11. The information processing device according to claim 8,
- wherein the vehicle conditions include a vehicle behavior state, and
- wherein the data reading unit estimates the vehicle behavior state at the travel point of the vehicle and reads the control parameter corresponding to the estimated vehicle behavior state from the map database.

12. The information processing device according to claim 1,
- wherein the observation values include at least any one of a roll rate, a pitch rate, and a yaw rate of the vehicle, a vertical acceleration, a longitudinal acceleration, and a lateral acceleration of a seat installation floor of the vehicle, and biological information of an occupant of the vehicle.

13. The information processing device according to claim 4,
- wherein the first determination unit changes a reference value based on at least one of the vehicle type and the vehicle class of the vehicle.

14. The information processing device according to claim 4, comprising a mode switching unit that adjusts the search setting value according to the state of the vehicle.

15. The information processing device according to claim 14,
- wherein the mode switching unit adjusts the search setting value based on at least any one of an instruction from the occupant of the vehicle, the presence or absence of a passenger other than the driver of the vehicle, attributes of the passenger, the presence or absence of the occupant when the vehicle is in automatic driving, biological information of the occupant, and driving experience of the driver.

16. A vehicle control method for controlling the behavior of a vehicle using an information processing device connected to the vehicle via a network, comprising
- preliminarily recording a control parameter for controlling the behavior of the vehicle in a map database included in the information processing device for a vehicle type at a travel point on a road, wherein vehicle type is set in consideration of the characteristics of the riding comfort for automobile manufacturers or brand and names,
transmitting vehicle information, including at least vehicle type information and positional information of the vehicle, from the vehicle to the information processing device,
reading the control parameter corresponding to the travel point of the vehicle from the map database based on the vehicle information received by the information processing device,
setting the application control parameter to be applied to control of the vehicle based on the control parameter read from the map database,
transmitting the set application control parameter from the information processing device to the vehicle,
performing control based on the application control parameter for the vehicle,
transmitting an observation value related to the behavior of the vehicle controlled based on the application control parameter from the vehicle to the information processing device, and
updating the map database based on the observation value received by the information processing device, wherein
a determination flag is given to the control parameter to indicate whether or not the control parameter has been obtained as an optimum a solution;
if the determination flag indicating that the control parameter has been obtained as an optimum solution is given to the control parameter, the data update unit does not update the map database based on the observation value acquired from the vehicle; and
if the determination flag indicating that the control parameter has not been obtained as an optimum solution is given to the control parameter, the data update unit updates the map database based on the observation value acquired from the vehicle.

17. An information processing system comprising:
an edge-side information processing device mounted on a vehicle, and
a center-side information processing device connected to the edge-side information processing device via a network,
wherein the center-side information processing device includes:
a map database in which a control parameter for controlling the behavior of the vehicle is recorded for a vehicle type at a travel point on a road, wherein
vehicle type is set in consideration of the characteristics of the riding comfort for automobile manufacturers or brand and names;
a data reading unit that acquires vehicle information including at least vehicle type information and positional information of the vehicle and reads the control parameter corresponding to the travel point of the vehicle from the map database based on the vehicle information;
a parameter setting unit that sets an application control parameter to be applied to control of the vehicle based on the control parameter read by the data reading unit; and
a data update unit that acquires an observation value related to the behavior of the vehicle controlled based on the application control parameter from the vehicle and updates the map database based on the observation value,
wherein the edge-side information processing device includes:
a vehicle information management unit that manages the vehicle information;
an observation unit that acquires the observation value from the vehicle; and
a transmission/reception unit that transmits the vehicle information and the observation value to the center-side information processing device and receives the application control parameter from the center-side information processing device, wherein
a determination flag is given to the control parameter to indicate whether or not the control parameter has been obtained as an optimum as a solution;
if the determination flag indicating that the control parameter has been obtained as an optimum solution is given to the control parameter, the data update unit does not update the map database based on the observation value acquired from the vehicle; and
if the determination flag indicating that the control parameter has not been obtained as an optimum solution is given to the control parameter, the data update unit updates the map database based on the observation value acquired from the vehicle.

* * * * *